(12) United States Patent
Snir et al.

(10) Patent No.: US 9,321,536 B2
(45) Date of Patent: Apr. 26, 2016

(54) METHODS AND SYSTEM FOR DEICING A SURFACE

(71) Applicant: Unmanned AeroSpace Technologies Ltd., Kadima (IL)

(72) Inventors: Amir Snir, Kadima (IL); Yoav Heichal, Tikva (IL)

(73) Assignee: Unmanned AeroSpace Technologies Ltd., Kadima (IL)

( * ) Notice: Subject to any disclaimer, the term of this patent is extended or adjusted under 35 U.S.C. 154(b) by 11 days.

(21) Appl. No.: 14/216,643

(22) Filed: Mar. 17, 2014

(65) Prior Publication Data
US 2014/0263838 A1 Sep. 18, 2014

Related U.S. Application Data

(60) Provisional application No. 61/789,009, filed on Mar. 15, 2013, provisional application No. 61/788,792, filed on Mar. 15, 2013, provisional application No. 61/788,893, filed on Mar. 15, 2013.

(51) Int. Cl.
*B64D 15/22* (2006.01)
*B64D 15/14* (2006.01)
*B64D 15/16* (2006.01)

(52) U.S. Cl.
CPC .............. *B64D 15/22* (2013.01); *B64D 15/14* (2013.01); *B64D 15/16* (2013.01)

(58) Field of Classification Search
CPC ........ B65D 15/12; B65D 15/14; B65D 15/16; B65D 15/163; B65D 15/20; B65D 15/22; B65D 2033/0233; F03D 11/0025
See application file for complete search history.

(56) References Cited

U.S. PATENT DOCUMENTS

| | | | |
|---|---|---|---|
| 5,351,918 A | 10/1994 | Giamati et al. | |
| 5,523,959 A * | 6/1996 | Seegmiller | 702/130 |
| 5,562,265 A | 10/1996 | Rauckhorst, III | |
| 5,584,450 A | 12/1996 | Pisarski | |
| 5,609,314 A * | 3/1997 | Rauckhorst et al. | 244/134 A |
| 5,657,951 A | 8/1997 | Giamati | |
| 5,874,672 A * | 2/1999 | Gerardi et al. | 73/170.26 |
| 5,904,322 A | 5/1999 | Giamati et al. | |
| 5,921,502 A | 7/1999 | Al-Khalil et al. | |
| 6,129,314 A | 10/2000 | Giamati et al. | |
| 6,196,500 B1 * | 3/2001 | Al-Khalil et al. | 244/134 R |
| 6,283,411 B1 * | 9/2001 | Giamati et al. | 244/134 A |

(Continued)

OTHER PUBLICATIONS

Internatinal Search Report and Written Opinion from International Application No. PCT/IB2014/001559 dated Dec. 16, 2014.

*Primary Examiner* — Joseph W Sanderson
(74) *Attorney, Agent, or Firm* — Greenberg Traurig, LLP

(57) ABSTRACT

A method that includes receiving data from a sensor that is configured to supply data related to an ice layer thickness on a skin surface, calculating the ice layer thickness, comparing the ice layer thickness to a threshold thickness, vibrating the skin surface using at least one mechanical element for a sufficient duration, sufficient frequency, and sufficient displacement to result in removal of a first portion of the ice layer thereby resulting in at least a partially deiced skin surface, and heating the partially deiced skin surface using at least one heating element. The method further includes heating from a leading edge of the skin surface to a trailing edge of the skin surface and heating the surface to result in a sufficient temperature increase in the skin surface for removal of a second portion of the ice layer.

22 Claims, 19 Drawing Sheets

(56) References Cited

U.S. PATENT DOCUMENTS

| | | |
|---|---|---|
| 7,291,815 B2 | 11/2007 | Hubert et al. |
| 7,546,980 B2 | 6/2009 | Giamati |
| 7,708,227 B2 | 5/2010 | Al-Khalil |
| 7,854,412 B2 | 12/2010 | Al-Khalil |
| 8,517,313 B2 * | 8/2013 | Gornik ................. 244/134 R |
| 2005/0067532 A1 * | 3/2005 | Hindel et al. ............ 244/134 D |
| 2007/0170312 A1 * | 7/2007 | Al-Khalil ................. 244/134 A |
| 2010/0206990 A1 | 8/2010 | Petrenko |
| 2011/0210207 A1 | 9/2011 | Gornik |
| 2012/0091276 A1 | 4/2012 | Al-Khalil |
| 2013/0068747 A1 * | 3/2013 | Armatorio et al. ............ 219/202 |
| 2013/0299637 A1 * | 11/2013 | Hoffenberg ................ 244/134 A |
| 2013/0299638 A1 * | 11/2013 | Gornik ................. 244/134 F |
| 2014/0191082 A1 * | 7/2014 | Figueroa-Karlstrom . 244/134 A |
| 2014/0224782 A1 * | 8/2014 | Nordman et al. ............. 219/202 |
| 2015/0129720 A1 * | 5/2015 | Strobl et al. ............. 244/134 D |

\* cited by examiner

*The outer process (example)*

METHODS AND SYSTEM FOR DEICING A SURFACE

RELATED APPLICATIONS

This application claims the benefit of U.S. Provisional Application No. 61/789,009, entitled "METHODS AND SYSTEM FOR DEICING A SURFACE", filed Mar. 15, 2013, U.S. Provisional Application No. 61/788,792, entitled "MECHANICAL DEICING", filed Mar. 15, 2013, U.S. Provisional Application No. 61/788,893, entitled "COMPOSITE", filed Mar. 15, 2013, which are hereby incorporated by reference herein in their entirety for all purposes.

TECHNICAL FIELD

The system and method relates to deicing of surfaces. In some embodiments, the system and method relate to deicing of surfaces of airborne vehicles.

BACKGROUND

Systems and methods for deicing airborne vehicles are known.

SUMMARY OF INVENTION

In an embodiment, the method comprises receiving first data from at least one first sensor; wherein the at least one first sensor is configured to supply data related to a thickness of an ice layer on a skin surface. In the embodiment, the method further includes calculating the thickness of the ice layer and comparing the thickness of the ice layer to a threshold thickness.

In the embodiment, the method further includes, based, at least in part, on the comparing the thickness of the ice layer to the threshold thickness, vibrating the skin surface using at least one mechanical element for a sufficient duration, sufficient frequency, and sufficient displacement so as to result in removal of a first portion of the ice layer thereby resulting in at least a partially deiced skin surface. In the embodiment, the method includes heating the partially deiced skin surface using at least one heating element. In the embodiment, the heating is conducted from a leading edge of the skin surface to a trailing edge of the skin surface. In the embodiment, the heating the partially deiced skin surface results in a sufficient temperature increase in the partially deiced skin surface for removal of a second portion of the ice layer.

In another embodiment, the method further includes receiving second data from at least one second sensor. In the embodiment, the at least one second sensor is configured to supply data related to one or more of the following: i) air flow at one or more locations on the skin surface, ii) air temperature, iii) relative pressure, and/or iv) humidity.

In some embodiments, the threshold thickness is at least 0.3 millimeters. In some embodiments, the sufficient duration of each of the at least one mechanical elements ranges from 0.01 seconds to 5 seconds. In some embodiments, the sufficient duration of each of the at least one mechanical elements ranges from 0.01 seconds to 3 seconds.

In some embodiments, the sufficient frequency of ranges from 0.01 to 1000 hertz. In other embodiments, the sufficient frequency ranges from 10 to 500 hertz.

In some embodiments, the sufficient displacement of each of the at least one mechanical elements ranges from 1 millimeter to 20 millimeters. In other embodiments, the temperature increase of the partially deiced skin surface is at least 2 degrees Celsius.

In embodiments, the removal of the first portion and the second portion of the ice layer results in complete removal of the ice layer. In yet other embodiments, a residual ice layer is present after removal of the first portion and the second portion of the ice layer and the residual ice layer comprises a thickness of 0.5 millimeters to 10 millimeters.

In an embodiment, the method includes receiving first data from at least one first sensor; wherein the at least one first sensor is configured to supply data related to a thickness of an ice layer on a skin surface. In the embodiment, the method further includes calculating the thickness of the ice layer and comparing the thickness of the ice layer to a threshold thickness.

In the embodiment, the method further includes based, at least in part, on the comparing the thickness of the ice layer to the threshold thickness, vibrating the skin surface using at least one mechanical element for a sufficient duration, sufficient frequency, and sufficient displacement so as to result in removal of a first portion of the ice layer thereby resulting in at least a partially deiced skin surface. In the embodiment, the sufficient frequency of ranges from 0.01 to 1000 hertz and the sufficient displacement of each of the at least one mechanical elements ranges from 1 millimeter to 20 millimeters.

In the embodiment, the method includes heating the partially deiced skin surface using at least one heating element. In the embodiment, the heating is conducted from a leading edge of the skin surface to a trailing edge of the skin surface and the heating the partially deiced skin surface results in a sufficient temperature increase in the partially deiced skin surface for removal of a second portion of the ice layer.

In some embodiments, the sufficient duration of each of the at least one mechanical elements ranges from 0.01 seconds to 5 seconds.

In yet another embodiment, the system includes at least one mechanical element. In the embodiment, the system includes at least one mechanical element is configured to vibrate a skin surface for a duration, a frequency, and a displacement. In some embodiments, the system includes at least one heating device. In the embodiment, the at least one heating device comprises at least one heating element. In the embodiment, the at least one heating device is configured to heat the skin surface from a leading edge of the skin surface to a trailing edge of the skin surface. In the embodiment, the at least one heating device is configured, when positioned on the skin surface, to allow the skin surface to be vibrated by the at least one mechanical element for the duration, the frequency and the displacement.

In the embodiment, the system includes at least one first sensor. In some embodiments, the at least one first sensor is configured to provide first data related to a thickness of an ice layer on the skin surface. In the embodiment, the system includes a control system. In the embodiment, the system includes a control system is configured to receive the first data, calculate a thickness of an ice layer on the skin surface, compare the thickness of the ice layer to a threshold thickness, based, at least in part, on the comparison of the thickness of the ice layer to the threshold thickness, activate the at least one mechanical element for a sufficient duration, sufficient frequency, and sufficient displacement so as to result in removal of a first portion of the ice layer thereby resulting in at least a partially deiced skin surface; and activate the at least one heating element in the heating device so as to result in heating from a leading edge of the skin surface to a trailing edge of the skin surface; and heating the partially deiced skin surface sufficiently for removal of a second portion of the ice layer.

In embodiments, the heating device is a thermal mat. In embodiments, the thermal mat comprises at least two of the following: a carbon fiber sheet, a foam sheet, and a conductive strip.

In some embodiments, the control system is further configured to calculating a first power required for deicing and comparing the first power required for deicing to a second power available to an aircraft.

In some embodiments, the at least one mechanical element comprises an actuator.

In some embodiments, the at least one mechanical element comprises a plurality of actuators. In some embodiments, the plurality of actuators are positioned on an installation device and the installation device is configured to be positioned within an aerodynamic surface of an aircraft.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

FIG. 4 illustrates a nominal procedure according to an embodiment of the present invention.

FIG. 5 illustrates a hybrid procedure according to an embodiment of the present invention.

Figure 1:
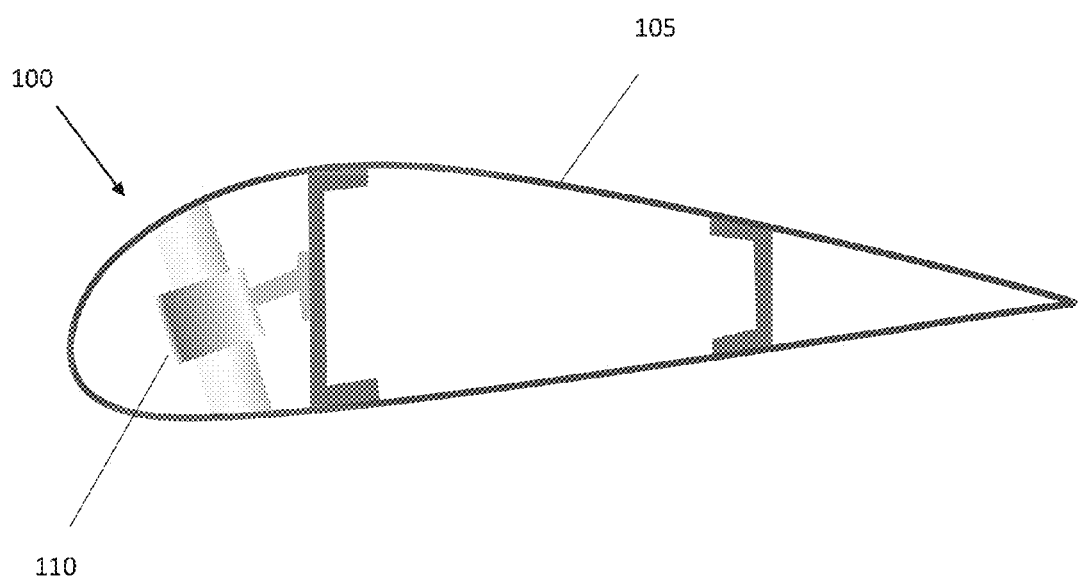
FIG. 1 illustrates features of some embodiments of the present invention.

The figures constitute a part of this specification and include illustrative embodiments of the present invention and illustrate various objects and features thereof. Further, the figures are not necessarily to scale, some to features may be exaggerated show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In an embodiment, the method comprises receiving first data from at least one first sensor; wherein the at least one first sensor is configured to supply data related to a thickness of an ice layer on a skin surface. In the embodiment, the method further includes calculating the thickness of the ice layer and comparing the thickness of the ice layer to a threshold thickness.

In the embodiment, the method further includes, based, at least in part, on the comparing the thickness of the ice layer to the threshold thickness, vibrating the skin surface using at least one mechanical element for a sufficient duration, sufficient frequency, and sufficient displacement so as to result in removal of a first portion of the ice layer thereby resulting in at least a partially deiced skin surface. In the embodiment, the method includes heating the partially deiced skin surface using at least one heating element. In the embodiment, the heating is conducted from a leading edge of the skin surface to a trailing edge of the skin surface. In the embodiment, the heating the partially deiced skin surface results in a sufficient temperature increase in the partially deiced skin surface for removal of a second portion of the ice layer.

In some embodiments the first portion is 10% of the ice layer and the second portion is 90% of the ice layer. In some embodiments the first portion is 20% of the ice layer and the second portion is 80% of the ice layer. In some embodiments the first portion is 30% of the ice layer and the second portion is 70% of the ice layer. In some embodiments the first portion is 40% of the ice layer and the second portion is 60% of the ice layer. In some embodiments the first portion is 50% of the ice layer and the second portion is 50% of the ice layer. In some embodiments the first portion is 60% of the ice layer and the second portion is 40% of the ice layer. In some embodiments the first portion is 70% of the ice layer and the second portion is 30% of the ice layer. In some embodiments the first portion is 80% of the ice layer and the second portion is 20% of the ice layer. In some embodiments the first portion is 90% of the ice layer and the second portion is 10% of the ice layer.

In some embodiments the first portion is 10% of the ice removed from skin surface ("ice removed") and the second portion is 90% of the ice removed. In some embodiments the first portion is 20% of the ice removed and the second portion is 80% of the ice removed. In some embodiments the first portion is 30% of the ice removed and the second portion is 70% of the ice removed. In some embodiments the first portion is 40% of the ice removed and the second portion is 60% of the ice removed. In some embodiments the first portion is 50% of the ice removed and the second portion is 50% of the ice removed. In some embodiments the first portion is 60% of the ice removed and the second portion is 40% of the ice removed. In some embodiments the first portion is 70% of the ice removed and the second portion is 30% of the ice removed. In some embodiments the first portion is 80% of the ice removed and the second portion is 20% of the ice removed. In some embodiments the first portion is 90% of the ice removed and the second portion is 10% of the ice removed.

In another embodiment, the method includes receiving second data from at least one second sensor. In the embodiment, the at least one second sensor is configured to supply data related to one or more of the following: i) air flow at one or more locations on the skin surface, ii) air temperature, iii) relative pressure, and/or iv) humidity.

In some embodiments, the threshold thickness is at least 0.3 millimeters. In some embodiments, the sufficient duration of each of the at least one mechanical elements ranges from 0.01 seconds to 5 seconds. In some embodiments, the sufficient duration of each of the at least one mechanical elements ranges from 0.01 seconds to 3 seconds.

In some embodiments, the sufficient frequency of ranges from 0.01 to 1000 hertz. In other embodiments, the sufficient frequency ranges from 10 to 500 hertz.

In some embodiments, the sufficient displacement of each of the at least one mechanical elements ranges from 1 millimeter to 20 millimeters. In other embodiments, the temperature increase of the partially deiced skin surface is at least 2 degrees Celsius.

In embodiments, the removal of the first portion and the second portion of the ice layer results in complete removal of the ice layer. In yet other embodiments, a residual ice layer is present after removal of the first portion and the second portion of the ice layer and the residual ice layer comprises a thickness of 0.5 millimeters to 10 millimeters.

In an embodiment, the method includes receiving first data from at least one first sensor; wherein the at least one first sensor is configured to supply data related to a thickness of an ice layer on a skin surface. In the embodiment, the method further includes calculating the thickness of the ice layer and comparing the thickness of the ice layer to a threshold thickness.

In the embodiment, the method further includes based, at least in part, on the comparing the thickness of the ice layer to the threshold thickness, vibrating the skin surface using at least one mechanical element for a sufficient duration, sufficient frequency, and sufficient displacement so as to result in removal of a first portion of the ice layer thereby resulting in at least a partially deiced skin surface. In the embodiment, the sufficient frequency of ranges from 0.01 to 1000 hertz and the sufficient displacement of each of the at least one mechanical elements ranges from 1 millimeter to 20 millimeters.

In the embodiment, the method includes heating the partially deiced skin surface using at least one heating element. In the embodiment, the heating is conducted from a leading edge of the skin surface to a trailing edge of the skin surface and the heating the partially deiced skin surface results in a sufficient temperature increase in the partially deiced skin surface for removal of a second portion of the ice layer.

In some embodiments, the sufficient duration of each of the at least one mechanical elements ranges from 0.01 seconds to 5 seconds.

In yet another embodiment, the system includes at least one mechanical element. In the embodiment, the system includes at least one mechanical element is configured to vibrate a skin surface for a duration, a frequency, and a displacement. In the embodiment, the system includes at least one heating device. In the embodiment, the at least one heating device comprises at least one heating element. In the embodiment, the at least one heating device is configured to heat the skin surface from a leading edge of the skin surface to a trailing edge of the skin surface. In the embodiment, the at least one heating device is configured, when positioned on the skin surface, to allow the skin surface to be vibrated by the at least one mechanical element for the duration, the frequency and the displacement.

In the embodiment, the system includes at least one first sensor. In the embodiment, the at least one first sensor is configured to provide first data related to a thickness of an ice layer on the skin surface. In the embodiment, the system includes a control system. In the embodiment, the system includes a control system is configured to receive the first data, calculate a thickness of an ice layer on the skin surface, compare the thickness of the ice layer to a threshold thickness, based, at least in part, on the comparison of the thickness of the ice layer to the threshold thickness, activate the at least one mechanical element for a sufficient duration, sufficient frequency, and sufficient displacement so as to result in removal of a first portion of the ice layer thereby resulting in at least a partially deiced skin surface; and activate the at least one heating element in the heating device so as to result in heating from a leading edge of the skin surface to a trailing edge of the skin surface; and heating the partially deiced skin surface sufficiently for removal of a second portion of the ice layer.

In embodiments, the heating device is a thermal mat. In embodiments, the thermal mat comprises at least two of the following: a carbon fiber sheet, a foam sheet, and a conductive strip.

In some embodiments, the control system is further configured to calculating a first power required for deicing and comparing the first power required for deicing to a second power available to an aircraft.

In some embodiments, the at least one mechanical element comprises an actuator.

In some embodiments, the at least one mechanical element comprises a plurality of actuators. In some embodiments, the plurality of actuators are positioned on an installation device and the installation device is configured to be positioned within an aerodynamic surface of an aircraft.

In some embodiments, the present invention includes a method and system for preventing and/or reducing ice accumulation on surfaces. In some embodiments, the surfaces may include, but are not limited to, surfaces of manned or unmanned airborne vehicles (UAV), wind turbines and/or other surfaces potentially subjected to icing conditions. In some embodiments, the surfaces may include surfaces of wings and/or propellers of manned or unmanned airborne vehicles, wind turbines, and the like. In some embodiments, the wings and/or propellers are formed of a "skin" having an outer surface exposed to one or more environmental conditions.

In some embodiments, the manner or unmanned airborne vehicles, wind turbines and the like are referred to as "protected systems".

In some embodiments, the system and method is designed to prevent and/or reduce accumulation of ice on surfaces subjected to atmospheric conditions. In some embodiments, the atmospheric conditions include, but are not limited to, freezing rain, sleet, snow, hail, freezing temperatures, or other atmospheric condition that can result in ice accumulation on an exposed surface.

In some embodiments, the method and system include at least one sensor for detecting conditions such as environmental conditions and/or conditions of the surface. In some embodiments, the at least one sensor is positioned in a section of the skin of the protected system (hereinafter referred to as "skin") exposed to the environment. In some embodiments, the at least one sensor is positioned in a section of the skin not exposed to the environment.

In some embodiments, the at least one sensor may include elements for detecting environmental conditions and/or mechanical and/or thermal conditions of the skin surface. In some embodiments, the at least one sensor is configured to detect conditions of the skin and/or skin surface such as ice thickness, temperature, and/or other related property. In some embodiments, the at least one sensor is configured to detect environmental conditions including, but not limited to, air flow speed at one or more locations along the surface, air temperature, relative pressure, and/or humidity.

In some embodiments, the at least one sensor may be configured to detect the available power for deicing in the protected system.

In some embodiments, the system and method may include one or more mechanical elements. In some embodiments, the mechanical elements are configured to vibrate the surface. In some embodiments, the mechanical elements include one or more vibration elements configured for vibrating the surface for a duration, frequency and/or displacement capable of removing and/or reducing the accumulation of ice on the surface. In some embodiments, the one or more mechanical elements include actuators configured for vibrating the surface.

FIG. 1 shows a non-limiting cross-section of a skin 105 having a skin surface 100 of the present invention. FIG. 1 also shows a non-limiting example of an actuator-type mechanical element 110 of the present invention.

In the embodiment show in FIG. 1, the mechanical elements are positioned in a section of the skin exposed to the environment. In some embodiments, the mechanical elements are positioned in a section of the skin not exposed to the environment.

In some embodiments, the mechanical elements are positioned in a pattern so as to result in at least a partial removal, reduction and/or at least a partial prevention of ice accumulation on the skin surface.

Figure 2A:
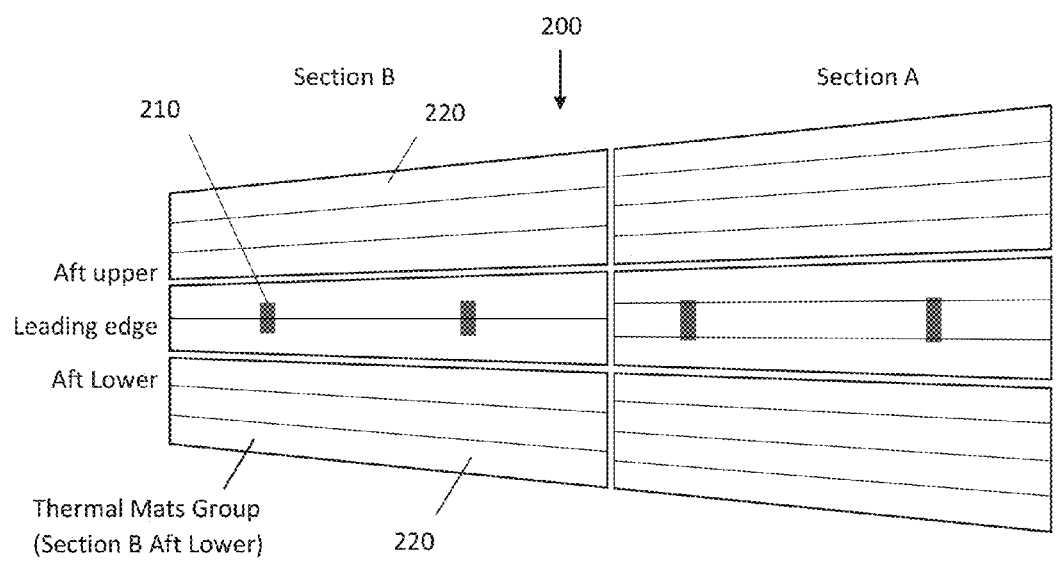
FIG. 2A illustrates features of some embodiments of the present invention.
Figure 2B:
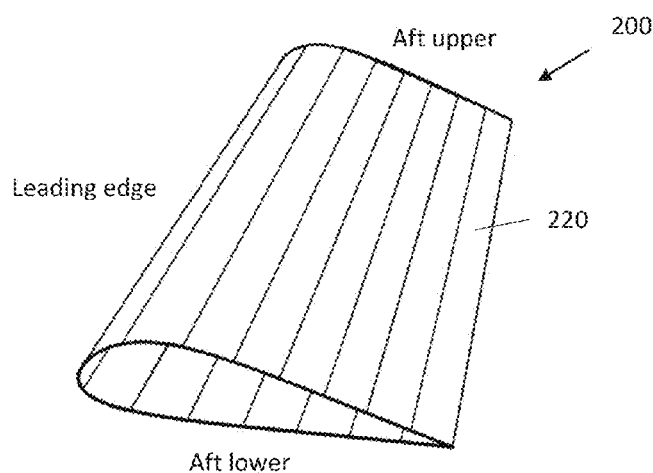
FIG. 2B illustrates features of some embodiments of the present invention.

The mechanical elements 210 are positioned along the surface as shown in FIGS. 2A and 2B.

In some embodiments, the system and method include one or more thermal elements. In some embodiments, the thermal elements are configured to heat the surface to a sufficient temperature so as to result at least a partial removal, reduction and/or prevention of ice accumulation on the skin surface.

In some embodiments, the thermal mats 220 are positioned in a pattern along the surface so as to result in at least a partial reduction and/or prevention of ice accumulation on the skin surface. In some embodiments, the thermal elements include a thermal mat. The thermal mats 220 may be positioned on the skin surface as shown in FIGS. 2A and 2B.

Figure 3:
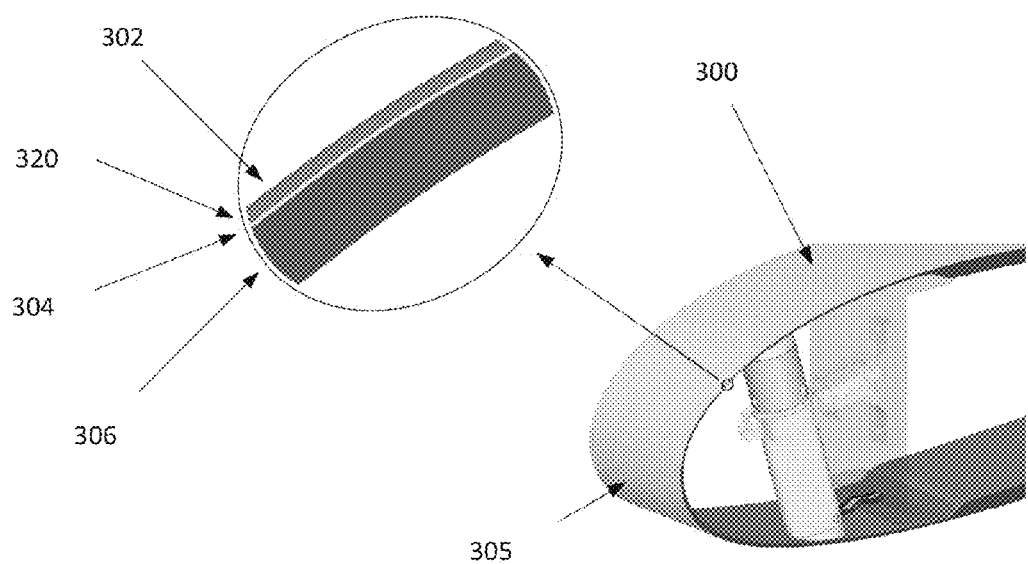
FIG. 3 illustrates features of some embodiments of the present invention.

In some embodiments, the thermal mats 320 form part of the skin 305 as shown in the cross-section of the skin 305 of FIG. 3. In the embodiment shown on FIG. 3, the skin 305 may include a surface coating 302, a thermal mat 320, an isolation layer 304, and/or a structural carbon fiber layer 306. In the embodiment, the isolation layer may be formed of fiberglass Kevlar fiber or equivalent. In the embodiment, the thermal mat 320 may include carbon fiber, conductive silver, and/or conductive copper and/or other conductive material configured for conduction of electric energy to the heaters for heating the surface.

In some embodiments, the surface may include two dimensional m×n array. In some embodiments, the configuration may be an alternate two dimensional layout as shown in the non-limiting example of FIG. 2A. In some embodiments, the mechanical, thermal, and/or sensory elements are configured to result in at least a partial removal, reduction and/or prevention of ice accumulation on the skin surface. In some embodiments, the size of m and/or n will vary based on specific conditions such as environmental conditions, etc.

In some embodiments, the system may further include at least one control unit to monitor, calculate and/or assess the various conditions such as the ice thickness on the surface, environmental conditions, etc. In the embodiments, the at least one control unit is configured to activate the mechanical and/or thermal elements based, at least in part, on conditions detected by the at least on sensor. In the embodiments, the at least sensor provides information regarding the conditions to the at least one control unit in real-time.

In some embodiments, the sensor and thermal elements are combined. In some embodiments, the sensor and thermal elements are both positioned in the thermal mat. In some embodiments, the mechanical, sensor and/or heating elements are separated.

In an embodiment, the method includes: detecting a thickness of ice on an surface of a protected system; detecting at least one of: i) air flow at one or more locations on the surface, ii) air temperature, iii) relative pressure and iv) humidity using at least one sensor; detecting a quantity of power available for deicing the skin surface; comparing the ice thickness to a threshold level; vibrating the skin surface using one or more mechanical elements for a sufficient duration, frequency, and displacement so as to result in removal and/or reduction in the ice thickness; removing, via breaking or equivalent, the ice from the leading edge; continuing the removal process by heating the skin from the leading edge to the trailing edge of the aerodynamic surface for a sufficient time using at least one heating element so as to result in a sufficient temperature increase in the skin surface to melt a layer positioned between the ice and the skin surface and thus allow the ice to by removed by the air flow.

In some embodiments, the method steps occur sequentially, concomitantly, or independently. In some embodiments, the heating step is conducted after the vibration step.

In embodiments, the threshold level of ice is equal to or greater than 1 millimeters. In embodiments, the threshold level of ice is equal to or greater than 0.5 millimeters. In embodiments, the threshold level of ice is equal to or greater than 0.3 millimeters. In embodiments, the threshold level of ice is equal to or greater than 0 millimeters. In embodiments, the vibrating step is conducted via mechanical pulsation using one or more mechanical elements such as actuators.

In some embodiments, the vibrating step is conducted using mechanical elements that are positioned in a spatial pattern and temporal sequence, based, at least in part, on the projected use of the protected system. In some embodiments, the project use of the protected system may be defined, at least in part, by the mission profile of the protected system.

In some embodiments, the vibrating step is conducted using mechanical elements such as actuators. In the embodiments, each of the mechanical elements may be operated for a duration ranging from 0.01 to 5 seconds, a frequency ranging from 0.01 to 1000 Hz, and/or a displacement amplitude ranging from 1 to 20 mm. In yet other embodiments, the duration, frequency, and/or displacement amplitude of one or more mechanical elements varies based, at least in part, on the conditions detected using the at least one sensor. As used herein, "displacement", "displacement amplitude", and "amplitude" may be used interchangeably.

In some embodiments, each of the mechanical elements may be operated for a duration ranging from 0.01 to 5 seconds. In other embodiments, each of the mechanical elements may be operated for a duration ranging from 0.05 to 4 seconds. In other embodiments, each of the mechanical elements may be operated for a duration ranging from 0.1 to 3 seconds.

In yet other embodiments, each of the mechanical elements may be operated for a duration ranging from 0.5 to 2 seconds. In other embodiments, each of the mechanical elements may be operated for a duration ranging from 1 to 1.5 seconds. In other embodiments, each of the mechanical elements may be operated for a duration ranging from 1.1 to 1.3 seconds.

In some embodiments, each of the mechanical elements may be operated for a frequency ranging from 0.01 to 1000 Hz. In other embodiments, each of the mechanical elements may be operated for a frequency ranging from 10 to 500 Hz. In other embodiments, each of the mechanical elements may be operated for a frequency ranging from 20 to 300 Hz. In other embodiments, each of the mechanical elements may be operated for a frequency ranging from 40 to 200 Hz. In yet other embodiments, each of the mechanical elements may be operated for a frequency ranging from 60 to 100 Hz. In another embodiment, each of the mechanical elements may be operated for a frequency ranging from 70 to 90 Hz.

In some embodiments, the mechanical elements may be operated using a displacement amplitude ranging from 1 to 20 mm. In yet other embodiments, the mechanical elements may be operated using a displacement amplitude ranging from 2 to 15 mm. In another embodiment, the mechanical elements may be operated using a displacement amplitude ranging from 4 to 12 mm. In another embodiment, the mechanical elements may be operated using a displacement amplitude ranging from 6 to 10 mm. In other embodiments, the mechanical elements may be operated using a displacement amplitude ranging from 7 to 9 mm.

In some embodiments, the displacement amplitude ranges from 1 millimeter to 20 millimeters. In other embodiments, the displacement amplitude ranges from 2 millimeters to 10 millimeters. In yet other embodiments, the displacement amplitude ranges from 1 millimeter to 5 millimeters. In other embodiments, the displacement amplitude ranges from 2 millimeters to 5 millimeters. In embodiments, the displacement amplitude ranges from 3 millimeters to 5 millimeters. In embodiments, the displacement amplitude is 4 millimeters.

In some embodiments, the heating step is conducted using one or more heating elements comprising at least one thermal mat. In some embodiments, the heating step is conducted using heating elements in a spatial pattern and temporal sequence based, at least in part, on the projected use of the protected system. In the embodiments, the project use of the protected system may be defined, at least in part, by the mission profile of the protected system.

In some embodiments, the heating step includes reducing and/or preventing accumulation of residual ice present after the vibrating step. In these embodiments, the heating step is conducted so as to increase the temperature of the skin surface from below the freezing point of one or more fluids including, but not limited to water (hereinafter referred to as "freezing point") to greater than 0 degrees Celsius. In these embodiments, the heating step is conducted to heat the interface layer between the ice and the skin surface sufficiently so as to result in sufficiently reducing the bond between the ice and the skin surface to allow removal or reduction in the ice thickness by flow of air along the skin surface.

In some embodiments, the heating step is conducted so as to increase the temperature of the skin surface from below the freezing point to over 0 degrees Celsius. In yet other embodiments, the heating step is conducted so as to increase the temperature of the skin surface from below freezing point to over 4 degrees Celsius. In other embodiments, the heating step is conducted so as to increase the temperature of the skin surface from below freezing point to over 3 degrees Celsius. In yet other embodiments, the heating step is conducted so as to increase the temperature of the skin surface from below freezing point to over 2 degrees Celsius. In other embodiments, the heating step is conducted so as to increase the temperature of the skin surface from below freezing point to over 10 degrees Celsius.

In some embodiments, the heating step is conducted so as to increase the temperature of the skin surface from below freezing point to over >40 degrees Celsius (up to structural integrity limitations). In other embodiments, the heating step is conducted so as to increase the temperature of the skin surface from below freezing point to over 30 degrees Celsius. In yet other embodiments, the heating step is conducted so as to increase the temperature of the skin surface from below freezing point to over −10 or more degrees Celsius.

In some embodiments, the method results in ice residuals having a thickness of less than 0.5 millimeters after deicing. In other embodiments, the residuals have a thickness ranging from 0.5 millimeters and 1 millimeter. In yet other embodiments, the residuals have a thickness ranging from 1 millimeter and 4 millimeters. In another embodiment, the residuals have a thickness ranging from 1 millimeter and 2 millimeters.

In some embodiments, the power required for the present invention ranges from 1% to 10% of the total power consumption required for operation of the aircraft. In other embodiments, the power required for the present invention is between 2% and 8%. In yet other embodiments, the power required for the present invention is between 2% and 6%. In other embodiments, the power required for the present invention is between 2% and 4%. In yet other embodiments, the power required for the present invention is between 1% and 3%.

In some embodiments, the method includes evaluation of the ice thickness on the skin surface combined with additional information from at least one sensor to initiate and optimize mechanical and/or thermal ice removal steps. In some embodiments, the method includes a combination of simultaneous heating (thermal) and vibration (mechanical) using patterns of thermal/mechanical elements positioned at the skin surface. The intensity and duration of the heating and/or vibration is based, at least in part, on the ice thickness, the environmental conditions or other condition potentially affecting the deicing and/or condition capable of detection using one or more sensors. In the embodiments, the patterns of ice removal are selected based on historical or real time data and analysis to reduce the bond between the ice and the skin surface via the application of heat and/or vibration and thus allow the removal of or reduction in the ice thickness by the flow of air along the surface.

In some embodiments, the process of ice-accretion assessment and removal may occur continuously throughout the duration of operation of the protected systems. In other embodiments, a control unit may be configured to implement the ice accumulation assessment and removal process on an intermittent basis. In some embodiments, the control unit implements the ice accumulation assessment and removal process based, at least in part, on the mission profile of the protected system, available power, environmental conditions, and/or the distribution of ice on the skin surface.

Figure 4:
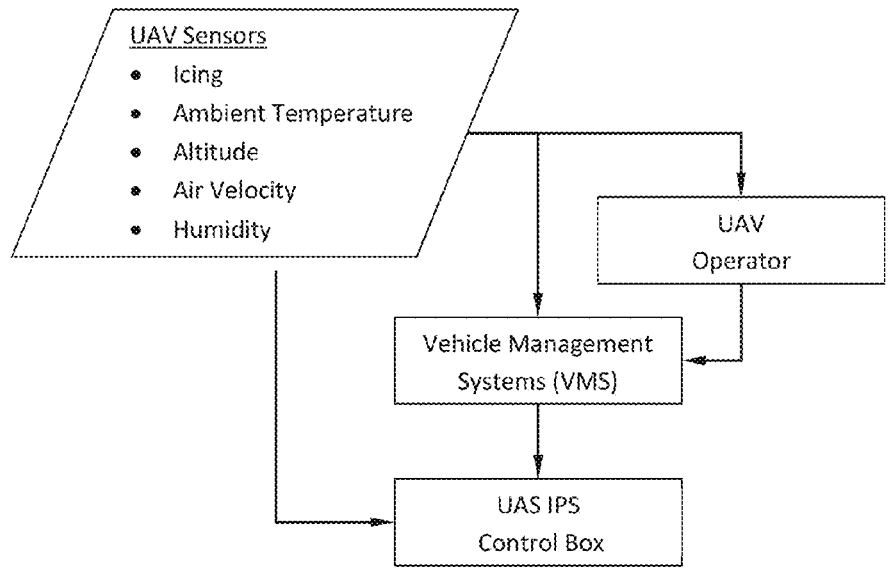
FIG. 4 illustrates features of some embodiments of the present invention. In some embodiment.
Figure 4:
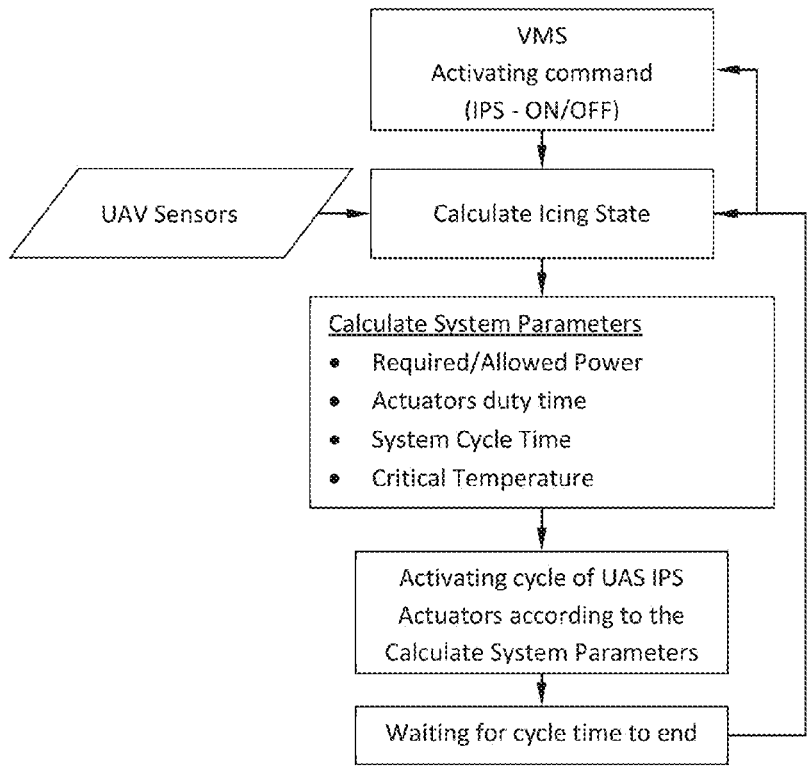
Figure 5:
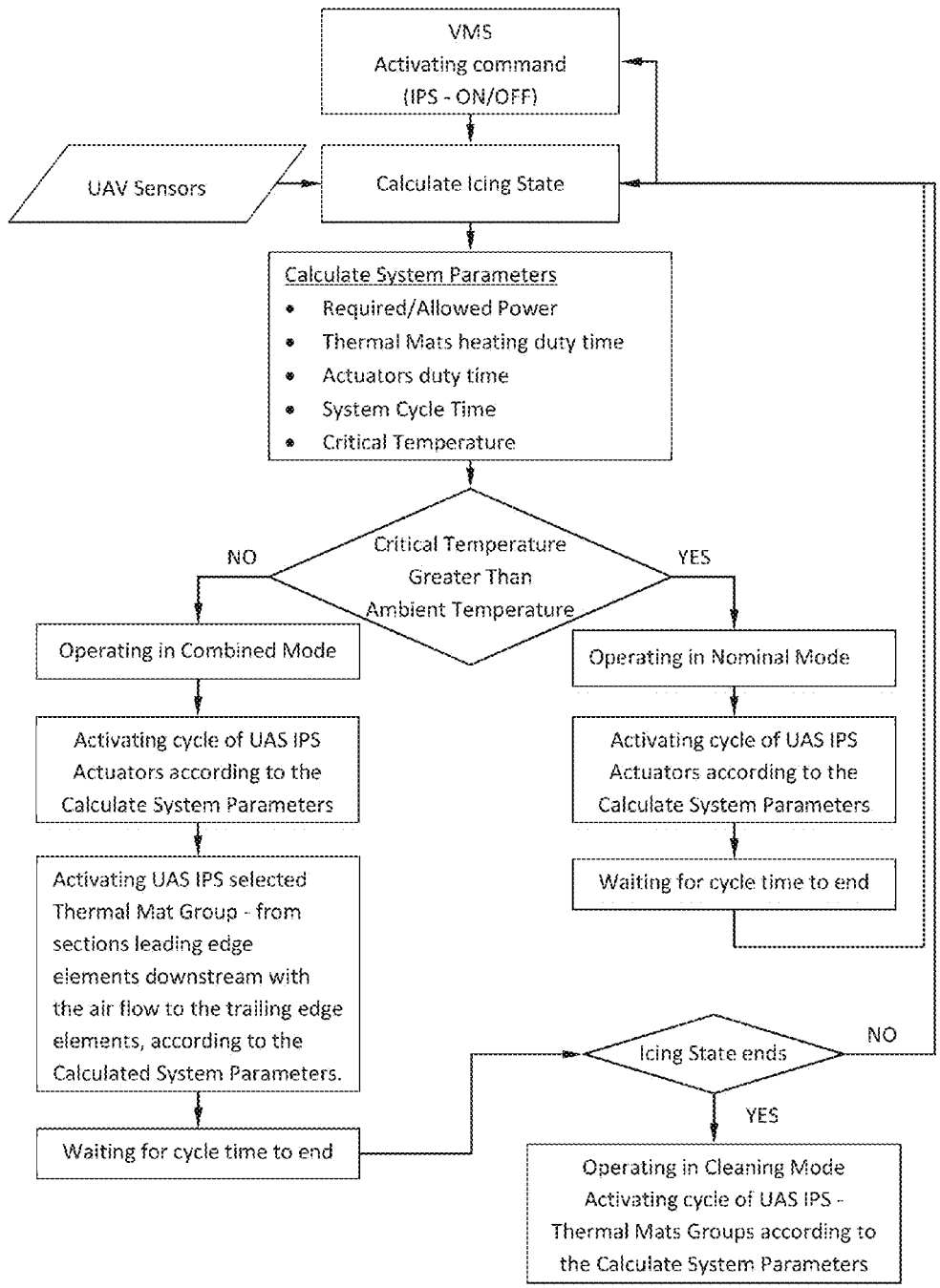
FIG. 5 illustrates features of some embodiments of the present invention. In some embodiments.

Non-limiting examples of the method of the present invention are shown on FIGS. 4 and 5.

In some embodiments, the present invention includes methods and system for mechanical deicing. In the embodiments, the method and system of deicing includes, but is not limited to installation of one or more vibration mechanisms such as actuators.

Figure 6A:
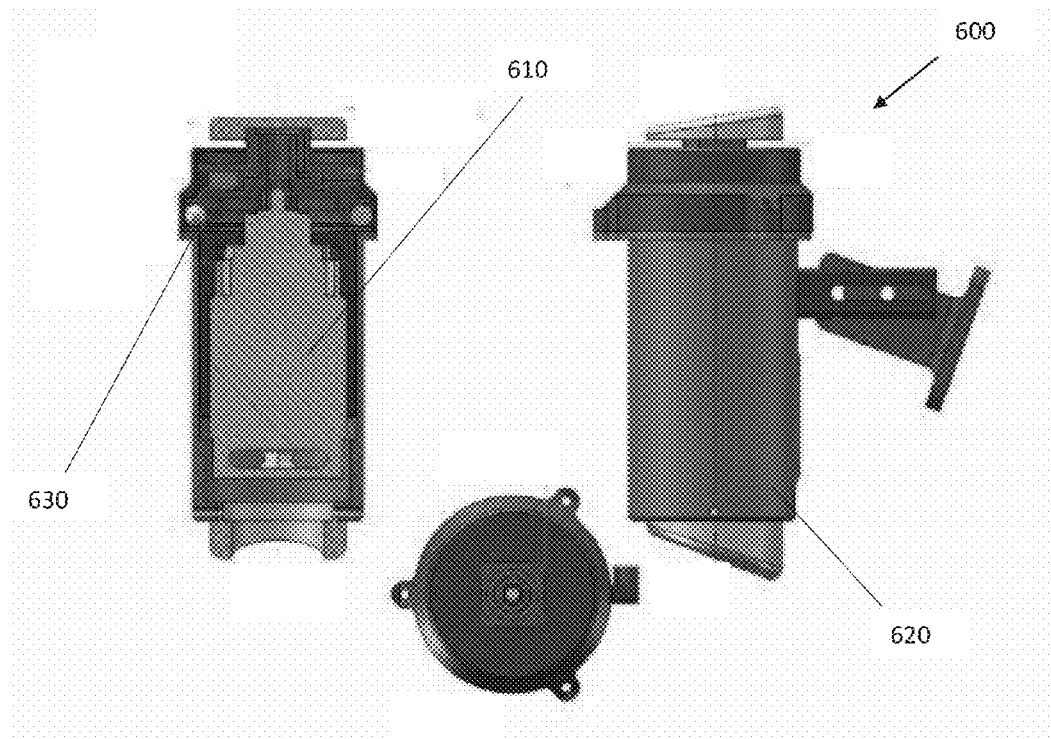
FIGS. 6A-6B illustrates features of some embodiments of the present invention.
Figure 6B:
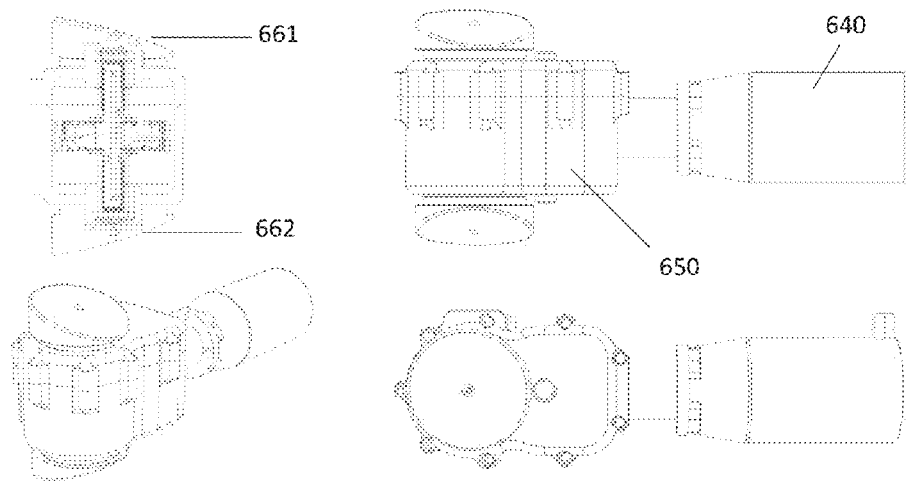

In some embodiments, the one or more actuators may include linear actuators as shown on FIGS. 6A-6B. In the embodiment shown on FIGS. 6A-6B, the linear actuator 600 may include a motor 610, a cylinder 620, and actuator assembly 630. In the embodiments, the linear actuator 600 uses the motor 610 to extend and retract the cylinder 620.

In the embodiments, the size of the cylinder 620 may be adjusted based on the size of the aerodynamic surface.

Figure 7A:
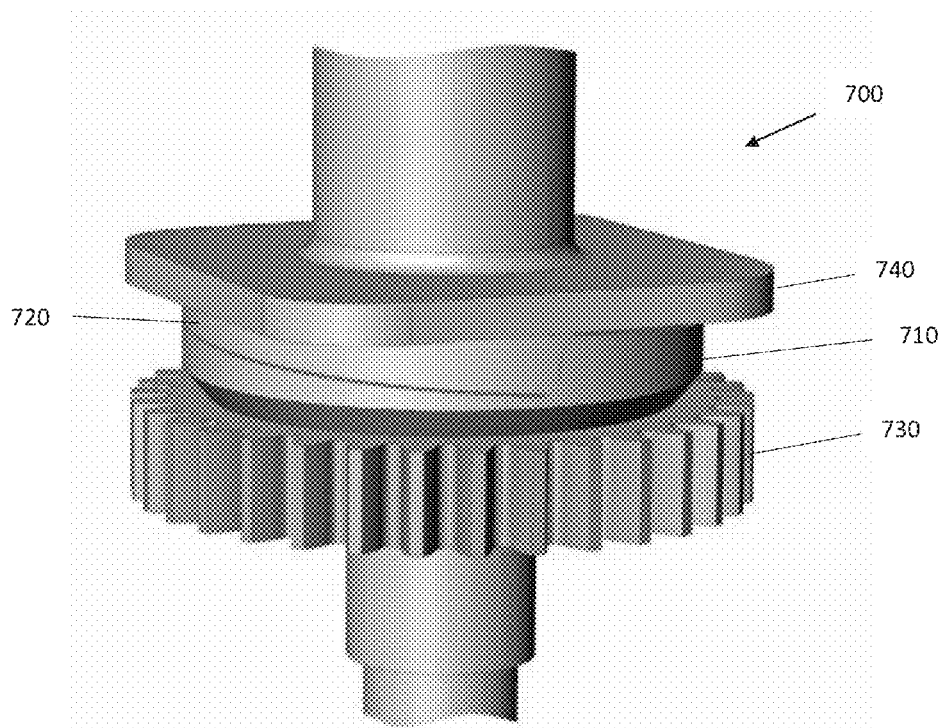
FIGS. 7A-7C illustrates features of some embodiments of the present invention.
Figure 7B:
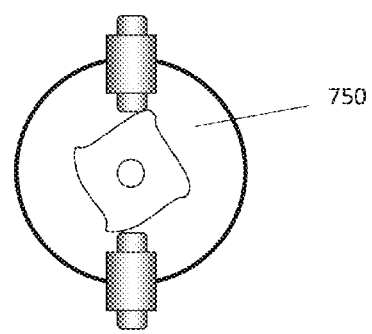
Figure 7C:
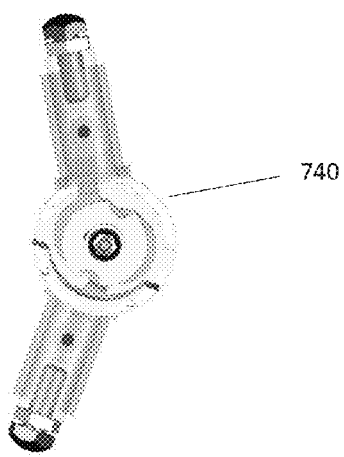

The linear actuator 600 may include an actuator mechanism 700 shown on FIGS. 7A-7C. In an embodiment, the actuator mechanism may be positioned within the actuator assembly 630. In other embodiments, the actuator motor 640 is positioned outside of the actuator assembly 650. In the embodiment shown in FIGS. 7A-7C, the actuator mechanism 700 includes a sawtooth 710 having a mirror surface 720. In other embodiments, the actuator mechanism further includes a nut (not shown) having a surface (not shown) designed for receiving the threaded surface 720. In the embodiment shown in FIGS. 7A-7C, the actuator mechanism further includes one or more gears 730 positioned within the actuator assembly 630. In the embodiment, the one or more gears 730 of the actuator mechanism may be connected to one or more corresponding gears (not shown) attached to the motor 610. In other embodiments, the one or more gears 730 of the actuator mechanism is connected to the one or more gears of the motor via a belt and/or a chain.

In an embodiment, the actuator mechanism further includes a base 740 for supporting the cylinder 620. In the embodiment, the sawtooth 710 is secured to a bottom surface of the base 740. In the embodiment, also the mirror sawtooth 720 is secured to the one or more gears 730 (not shown).

In some embodiments, the actuator may also include one or more ball bearings to reduce rotational friction and support radial and/or axial loads in the actuator. In some embodiments, the actuator mechanism 700 includes a piston like mechanism 750. In some embodiments, the actuator mechanism 700 includes a vertical sawtooth.

In embodiments, the components of the actuator are formed of low weight materials such as aluminum and/or thermoplastics. In other embodiments, the components of the actuator are formed from steel, brass, and/or aluminum.

In some embodiments, energizing the actuator 600 results in the extension and/or retraction of the cylinder 620. In the embodiments, the motor is energized resulting in rotation of the one or more gears attached to the motor. In the embodiments, the rotation of the one or more gears attached to the motor result in rotation of the one or more gears 730 positioned within the actuator assembly 630.

In other embodiments, rotation of the one or more gears 730 results in rotation of the nut (not shown) designed for receiving the threaded surface 720 of the sawtooth 710. In the embodiments, rotation of the nut results in the linear movement of the cylinder 620 and base 740 along the sawtooth. In some embodiments, rotation of the sawtooth results in the linear movement of the caps 661 and 662. In the embodiments, the linear movement of the cylinder 620 and base 740 results in extension of the cylinder 620. In the embodiments, the linear movement of the cylinder 620 and base 740 results in retraction of the cylinder 620.

Figure 8:
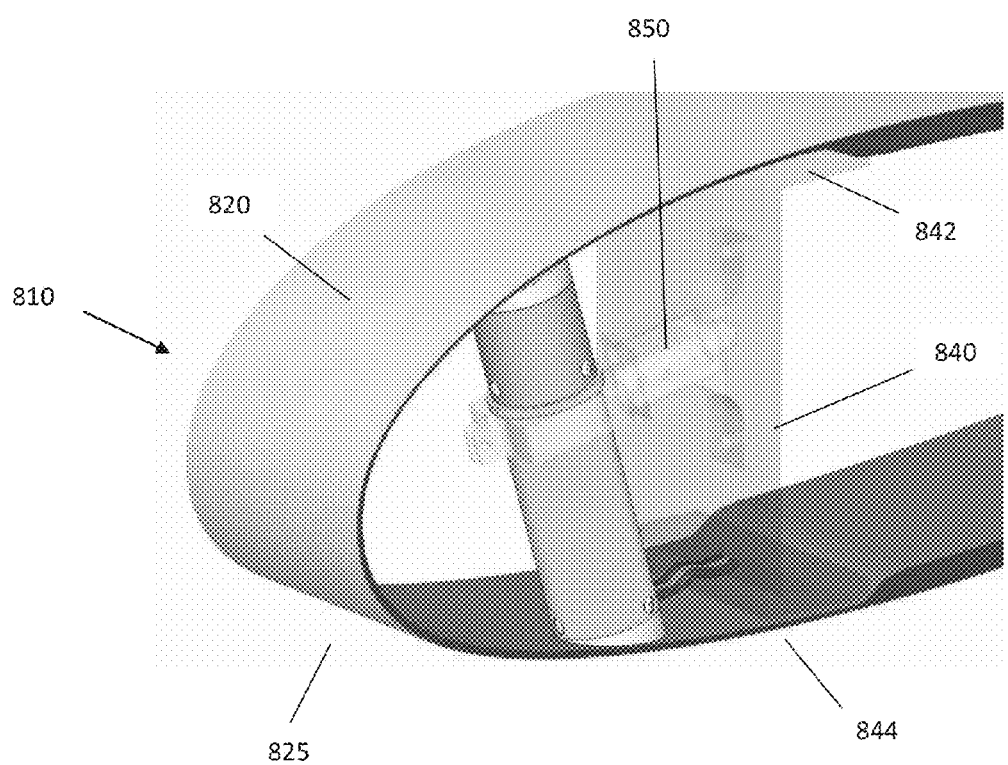
FIG. 8 illustrates features of some embodiments of the present invention.

In an embodiment, the one or more actuators are installed in an aerodynamic surface including, but not limited to, a wing, tail, propellers, and/or blade 810 of an aircraft as shown in FIG. 8. In the embodiment, the aircraft is an unmanned aerial vehicle (i.e., a drone) or other unmanned vehicle. In the embodiment, the system may be used in general aviation aircraft such as a small airplane, helicopter or equivalent.

In some embodiments, the aerodynamic surface may include, but are not limited to, surfaces of manned or unmanned airborne vehicles (UAV), wind turbines and/or other surfaces potentially subjected to icing conditions. In some embodiments, the surfaces may include surfaces of wings and/or propellers of manned or unmanned airborne vehicles, wind turbines, and the like. In some embodiments, the wings and/or propellers are formed of a "skin" having an outer surface exposed to one or more environmental conditions.

In some embodiments, the manner or unmanned airborne vehicles, wind turbines and the like are referred to as "protected systems".

In an embodiment, the one or more actuators are positioned so that the cylinder 620 of each actuator is positioned against or within close proximity of an inner surface of the aerodynamic surface 810 of an aircraft. In an embodiment, the cylinder 620 of each actuator is positioned against or within close proximity of an inner surface of an upper section 820 and lower section 825 of the aerodynamic surface 810 of an aircraft. In an embodiment, the caps 661 and 662 of each actuator is positioned against or within close proximity of an inner surface of an upper section 820 and lower section 825 of the aerodynamic surface 810 of an aircraft.

In embodiments, the cylinder 620 of each actuator is positioned so as to result in movement of the upper section 820 of the aerodynamic surface 810. In other embodiments, the cap 661 of each actuator is positioned so as to result in movement of the upper section 820 of the aerodynamic surface 810. In yet other embodiments, the cylinder 620 of each actuator is positioned to be adapted to cause controlled deformation amplitude of the upper section 820 and lower section 825 of the aerodynamic surface. In some embodiments, the cylinder 620 of each actuator is positioned within close proximity of the leading edge 830 of the aerodynamic surface 810. In embodiments, the "leading edge" is the front edge of the aerodynamic surface. In some embodiments, the caps 661 and 662 of each actuator is positioned within close proximity of the leading edge 830 of the aerodynamic surface 810. In some embodiments, the "leading edge" is the front edge of the aerodynamic surface.

In an embodiment, the one or more actuators is secured to an installation device 840 via one or more securing mechanism 850. In an embodiment, the installation device 840 comprises a rectangular sheet or equivalent. In an embodiment, the installation device 840 further includes a bracketed section 842, 844 adapted to be installed in the aerodynamic surface. In yet another embodiment, the securing mechanism 850 comprises one or more brackets and screws.

Figure 9:
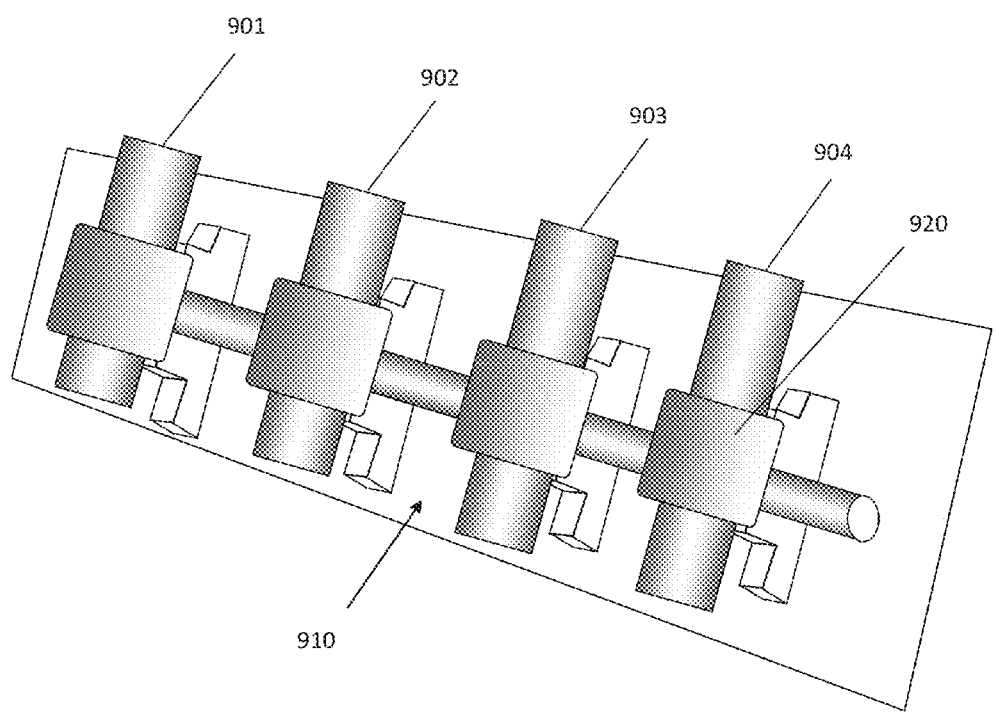
FIG. 9 illustrates features of some embodiments of the present invention.

In an embodiment, the installation device 840 includes more than one actuator 901, 902, 903, and/or 904 as shown on FIG. 9. In the embodiment, the installation device 840 includes a rectangular sheet 910 or equivalent for securing the more than one actuator 901, 902, 903, and/or 904. In the embodiment, the more than one actuator 901, 902, 903, and/or 904 are interconnected with conduit 920. In some embodiments, conduit 920 provides mechanical support of the more than one actuator 901, 902, 903, and/or 904. In the embodiment, conduit 920 provides protection for the electrical connections (not shown) that energize the more than one actuator 901, 902, 903, and/or 904. In the embodiment, conduit 920 provides both mechanical support and protection of electrical connections as described above.

In some embodiments, the installation device includes 1 actuator. In some embodiments, the installation device includes 2 actuators. In some embodiments, the installation device includes 3 actuators. In some embodiments, the installation device includes 4 actuators. In some embodiments, the installation device includes 5 actuators. In some embodiments, the installation device includes 6 actuators. In some embodiments, the installation device includes 7 actuators. In some embodiments, the installation device includes 8 actuators. In some embodiments, the installation device includes 9 actuators. In some embodiments, the installation device includes 10 actuators. In some embodiments, the installation device includes 11 actuators. In some embodiments, the installation device includes 12 actuators. In some embodiments, the installation device includes more than 12 actuators.

In an embodiment, the present invention is a method comprising installing a mechanical deicing system in an aerodynamic surface of an aircraft, wherein the installing step comprises attaching one or more actuators to an installation device, wherein the installation device is adapted to be positioned within the aerodynamic surface of the aircraft; and positioning the installation device within the aerodynamic surface of the aircraft, wherein the positioning step comprises inserting the installation device from a side of the aerodynamic surface opposite a body of the aircraft.

In embodiments, the actuators may be installed from the side of the aerodynamic surface opposite the body of the aircraft. In the embodiments, the actuators can be installed or removed manually. In some embodiments, the installation device is installed in grooves and/or tracks within the aerodynamic surface. In some embodiments, the actuators can be removed if icing conditions are not expected.

In some embodiments, the actuators may be installed in the aerodynamic surface so as to result in little or no impact on the aerodynamic surface's aerodynamics. In some embodiments, this installation method is effective for long endurance aircraft having laminar flow aerodynamic surfaces.

Figure 10:
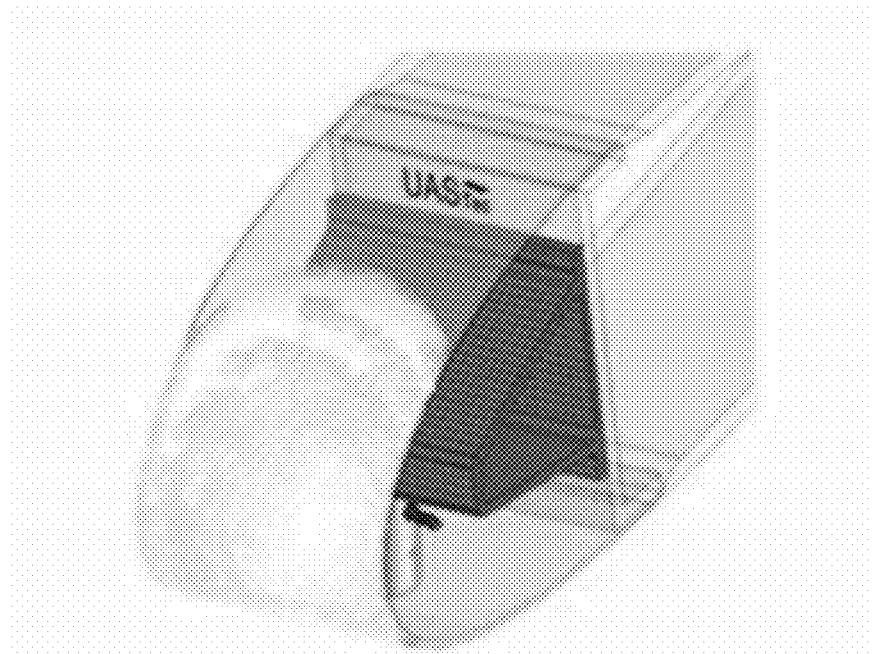
FIG. 10 illustrates features of some embodiments of the present invention.
Figure 11:
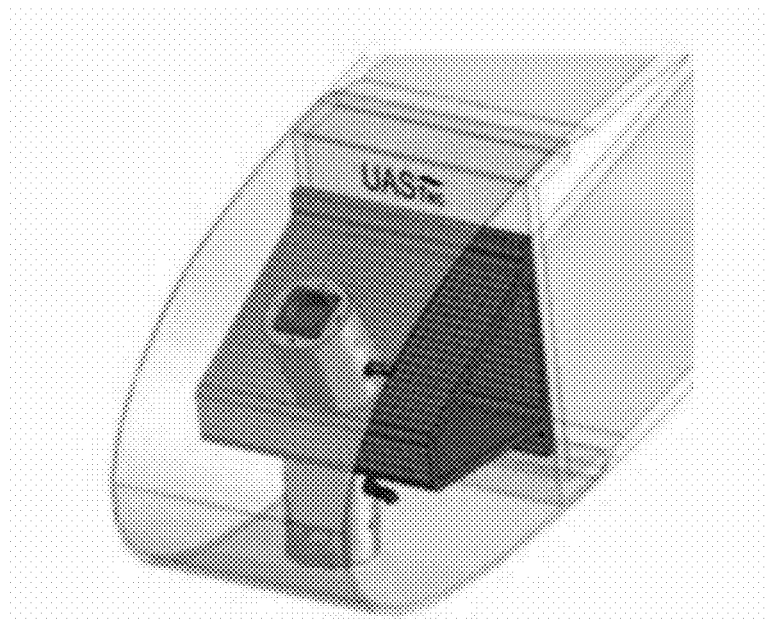
FIG. 11 illustrates features of some embodiments of the present invention.
Figure 12A:
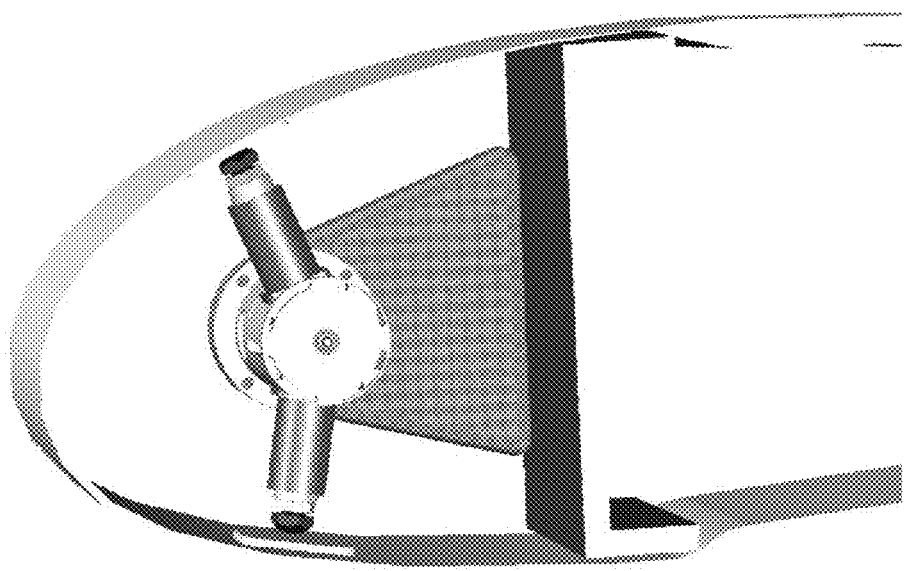
FIGS. 12A-12B illustrates features of some embodiments of the present invention.
Figure 12B:
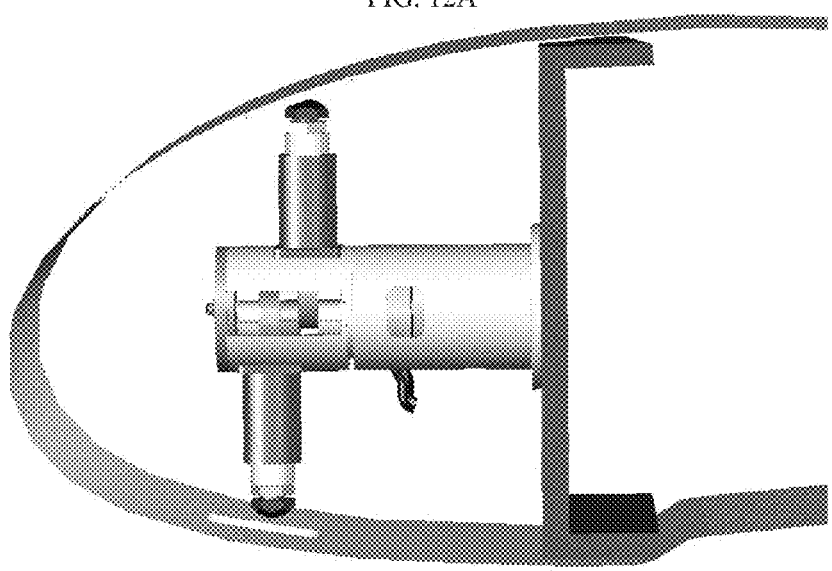
Figure 13A:
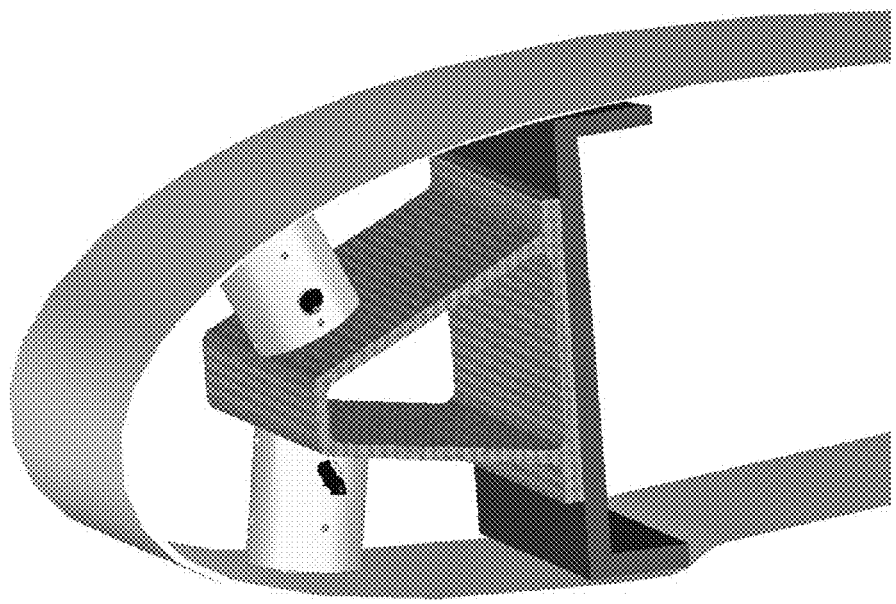
FIGS. 13A-13B illustrate features of some embodiments of the present invention.
Figure 13B:
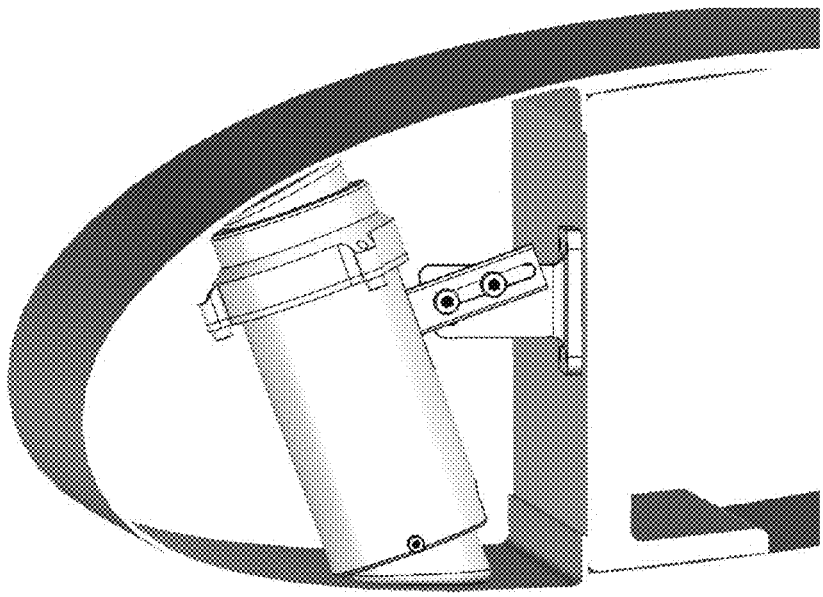
Figure 14:
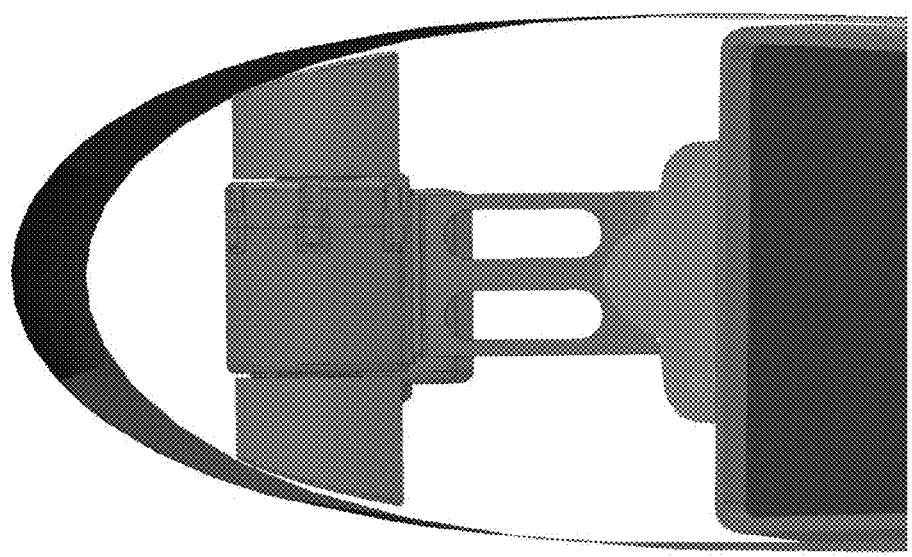
FIG. 14 illustrates features of some embodiments of the present invention.

In an embodiment, the instant invention is a method for mechanically deicing an aerodynamic surface using one or more actuators. In the embodiment, the method includes, but is not limited to, positioning one or more actuators in close proximity to a leading edge of an aircraft aerodynamic surface, where the leading edge of the aircraft aerodynamic surface is at least partially covered with ice, where each of the one or more actuators include at least one cylinder; energizing the one or more actuators so as to result in mechanical deformation of the aircraft aerodynamic surface by extension of the cylinder (or length) of each of the one or more actuators; deenergizing the one or more actuators so as to result in retraction of the cylinder or the caps of each of the one or more actuators; and repeating the energizing step and deenergizing steps until substantially all of the ice has been removed from the leading edge of the aircraft aerodynamic surface. In the embodiment, an aircraft aerodynamic surface with a leading edge at least partially covered in ice and an aircraft aerodynamic surface having a leading edge with the ice removed according to a method of the present invention is shown in FIGS. 10 and 11, respectively.

In some embodiments, the method includes deicing by mechanically deforming the aerodynamic surface. In some embodiments, the method includes adjusting the frequency and amplitude of the actuator to impart sufficient kinetic energy in the aerodynamic surface to fracture ice deposited on the aerodynamic surface. In embodiments, the frequency of the actuator may be increased while the amplitude of the actuator may be decreased resulting in no change in the kinetic energy imparted to the aerodynamic surface. In some embodiments, the frequency of the actuator may be decreased while the amplitude of the actuator may be increased resulting in no change in the kinetic energy imparted to the aerodynamic surface.

In some embodiments, the "amplitude" of the actuator is defined as the distance the cylinder and/or caps of the actuator travels from its original position to its extended position when the actuator is energized. In the embodiments, the amplitude of the actuator is measured in millimeters (mm). In some embodiments, the cylinder and/or caps of the actuator extends vertically. In some embodiments, the cylinder and/or caps of the actuator extends horizontally. In the embodiments, the cylinder and/or caps of the actuator extends at any angle between horizontal and vertical.

In some embodiments, the amplitude of the actuator is related to the width of the leading edge. In the embodiments, the amplitude of the actuator increases 5 millimeters for every 0.15 meter of leading edge width. In other embodiments, the amplitude of the actuator is 4 millimeters for an aerodynamic surface having a leading edge with a width of 0.12 meter. In yet other embodiments, the amplitude of the actuator is 10 millimeters for an aerodynamic surface having a leading edge with a width of 0.3 meters.

In some embodiments, the mechanical elements may be operated using a displacement amplitude ranging from 1 to 20 mm. In other embodiments, the mechanical elements may be operated using a displacement amplitude ranging from 2 to 15 mm. In other embodiments, the mechanical elements may be operated using a displacement amplitude ranging from 4 to 12 mm. In yet other embodiments, the mechanical elements may be operated using a displacement amplitude ranging from 6 to 10 mm. In yet other embodiments, the mechanical elements may be operated using a displacement amplitude ranging from 7 to 9 mm.

In embodiments, the displacement amplitude ranges from 1 millimeter to 20 millimeters. In other embodiments, the displacement amplitude ranges from 2 millimeters to 15 millimeters. In yet other embodiments, the displacement amplitude ranges from 4 millimeter to 12 millimeters. In other embodiments, the displacement amplitude ranges from 6 millimeters to 10 millimeters. In yet other embodiments, the displacement amplitude ranges from 7 millimeters to 9 millimeters.

In some embodiments, the amplitude of the actuator ranges from 1 millimeter to 10 millimeters. In other embodiments, the amplitude of the actuator ranges from 2 millimeters to 10 millimeters. In other embodiments, the amplitude of the actuator ranges from 1 millimeter to 5 millimeters. In yet other embodiments, the amplitude of the actuator ranges from 2 millimeters to 5 millimeters. In other embodiments, the amplitude of the actuator ranges from 3 millimeters to 5 millimeters. In other embodiments, the amplitude of the actuator is 4 millimeters.

In some embodiments, the "frequency" of the actuator is defined as the number of times actuator is energized and thus the cylinder of the actuator is extended per unit time. In the embodiments, the frequency of the actuator is measured in hertz.

In embodiments, the frequency of the actuators range from 0.01 to 1000 Hz. In other embodiments, the frequency of the actuators range from 10 to 500 Hz. In yet other embodiments, the frequency of the actuators range from 20 to 300 Hz. In other embodiments, the frequency of the actuators range from 40 to 200 Hz. In other embodiments, the frequency of the actuators range from 60 to 100 Hz. In yet other embodiments, the frequency of the actuators range from 70 to 90 Hz.

In embodiments, the installation device includes one or more actuators. In the embodiments, the installation device includes a bar or rod or equivalent for supporting the one or more actuators. In the embodiments, the bar or rod is formed of a material suitable for conditions associated with aviation such as extreme temperatures, forces, or other condition. In some embodiments, the bar or rod is formed of metal such as aluminum.

In some embodiments, the installation device further includes control circuits. In the embodiments, the control circuits allow remote operation of the actuators. In the embodiments, the installation device provides mechanical support of the one or more control circuits. In the embodiments, the installation device provides mechanical support for the one or more control circuits and the one or more actuators. In the embodiments, the installation device provides supports for one or more control circuits, where each control circuit is positioned adjacent to one of the one or more actuators.

In other embodiments, the installation device is configured to be manually removed from the aerodynamic surface. In the embodiments, the installation device and the control circuits and the actuators secured thereto are removed from the aerodynamic surface by removing the installation device.

In embodiments, the installation device is a rod or bar that may be removed along with the control circuits and the actuators by exerting a force on one or both ends of the rod or bar. In embodiments, the installation device in the form of a rod or bar is removed by pushing the rod or bar from the aerodynamic surface. In other embodiments, the installation device 840 in the form of a rod or bar is removed by pulling the rod or bar from the aerodynamic surface.

In some embodiments, removal of the installation device is completed manually. In other embodiments, the removal of the installation device is completed automatically using a mechanical device.

In some embodiments, the installation device is adapted to isolate the movement of the actuators to reduce or eliminate vibration in the aerodynamic surface not targeted for deicing.

Figure 15:
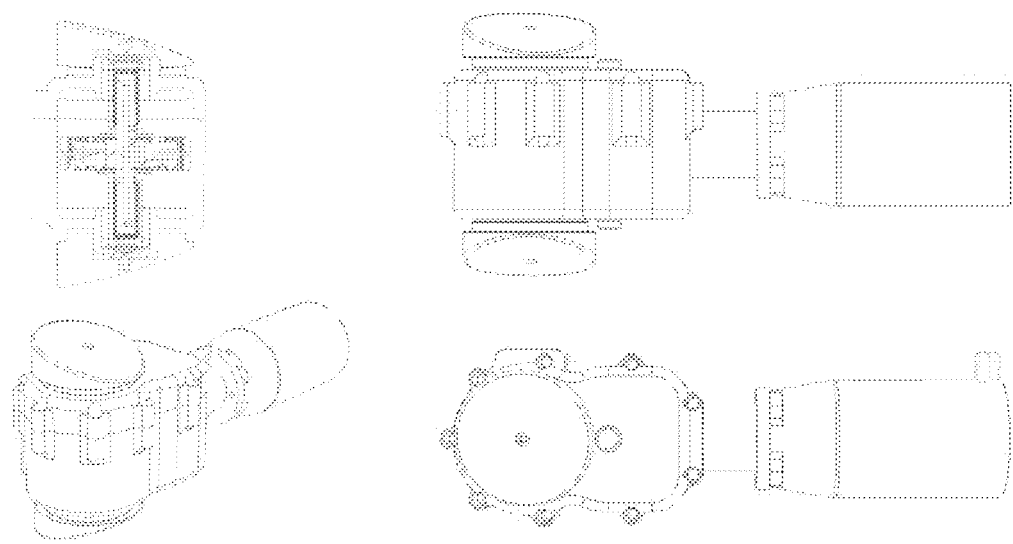
FIG. 15 illustrates features of some embodiments of the present invention.
Figure 16:
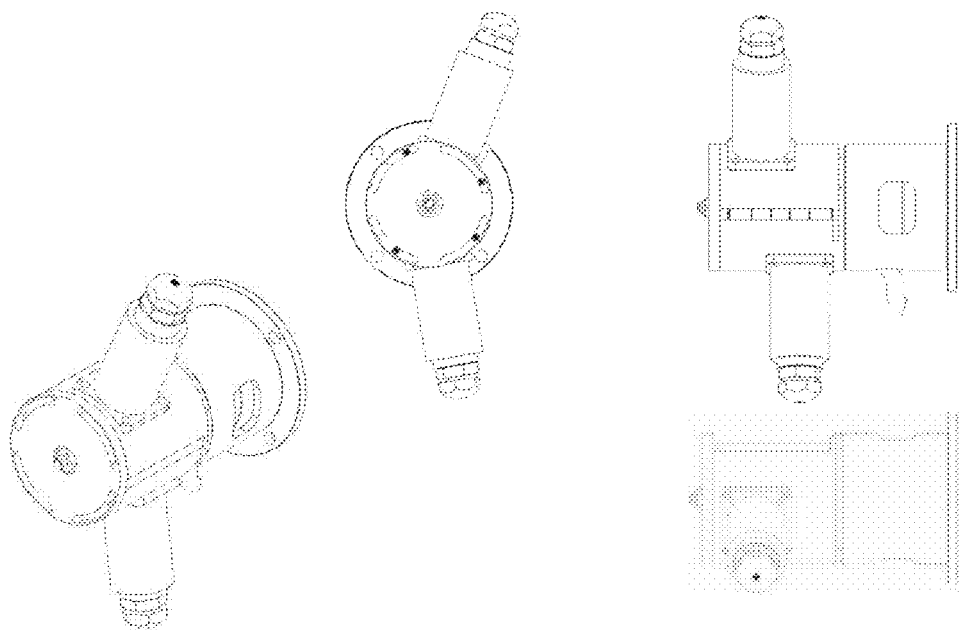
FIG. 16 illustrate features of some embodiments of the present invention.
Figure 17:
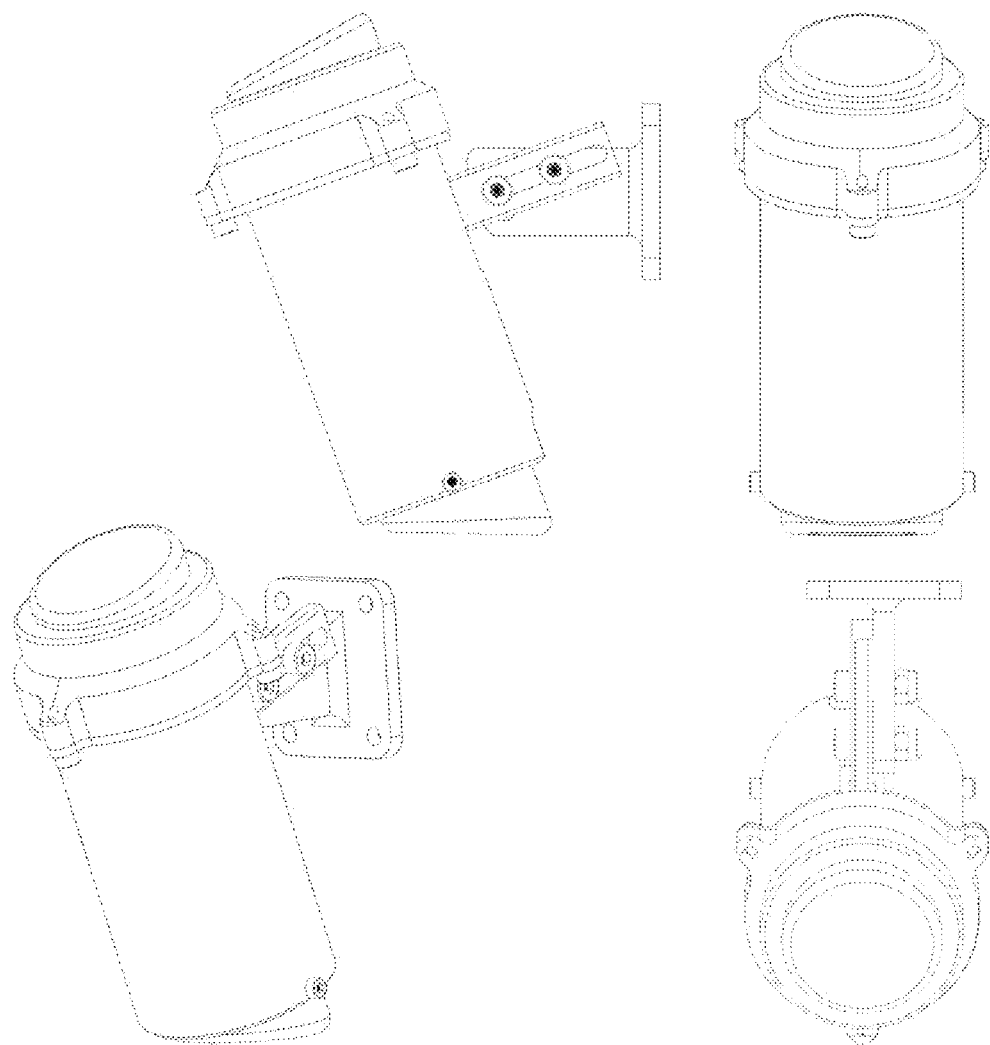
FIG. 17 illustrates features of some embodiments of the present invention.
Figure 18:
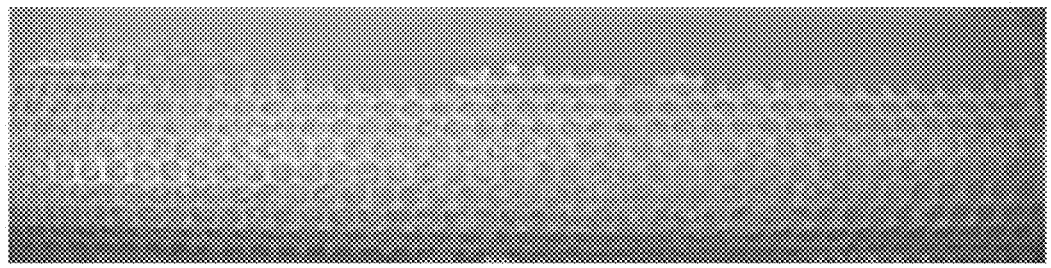
FIG. 18 illustrates features of some embodiments of the present invention.
Figure 19:
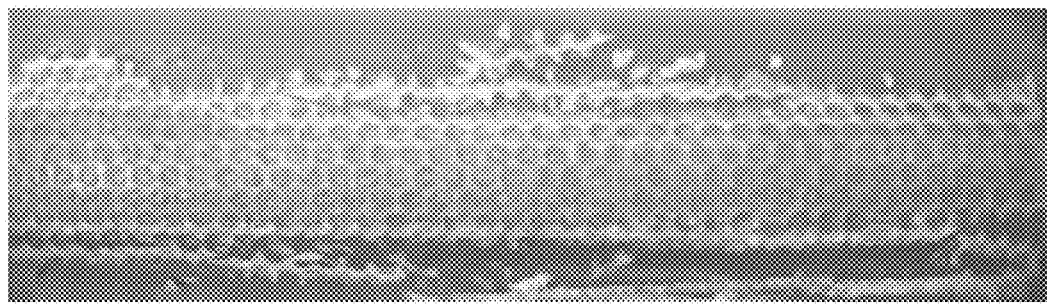
FIG. 19 illustrates features of some embodiments of the present invention.
Figure 20:
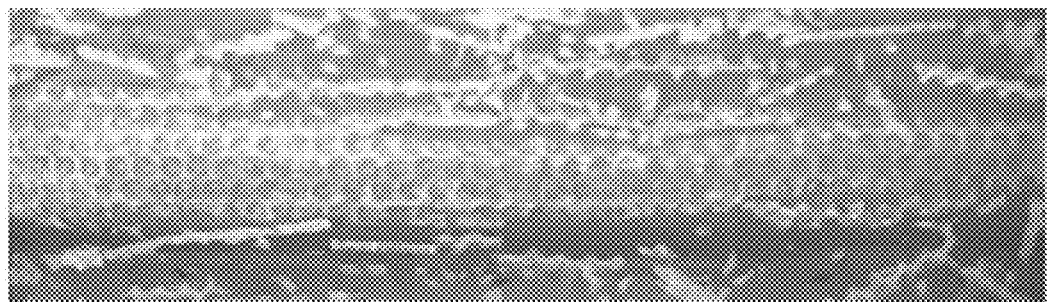
FIG. 20 illustrates features of some embodiments of the present invention.
Figure 21:
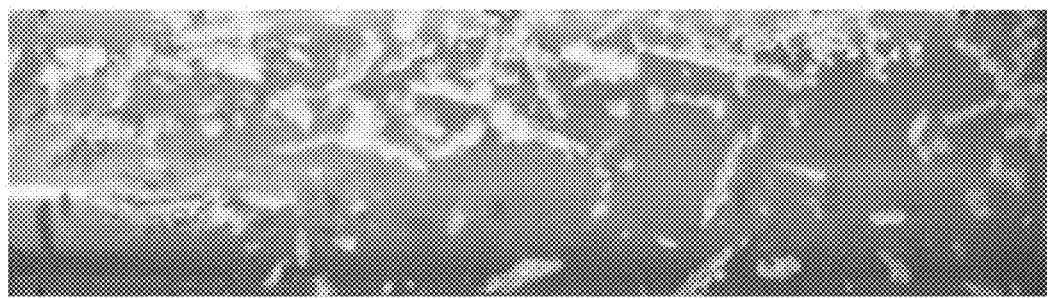
FIG. 21 illustrates features of some embodiments of the present invention.

Various embodiments of the actuator positioned in an aerodynamic surface are shown on FIGS. 12A-14. Various embodiments of the actuator are shown on FIGS. 15-17.

In some embodiments, the method of the present invention results in a residual ice thickness of less than 0.5 millimeters after deicing. In other embodiments, the residual ice thickness ranges between 0.5 millimeters and 1 millimeter. In yet other embodiments, the residual ice thickness ranges between 1 millimeter and 2 millimeters.

In some embodiments, the power required for the present invention ranges from 1% to 7% of the total power consumption required for operation of the aircraft. In other embodiments, the power required for the present invention is between 2% and 4%. In yet other embodiments, the power required for the present invention is between 1% and 3%.

In some embodiments, the weight of the actuators ranges from 2% to 4% of total weight of the aircraft. In the embodiments, the weight of the actuators ranges from 2.5% to 3.5% of the total weight of the aircraft.

Various screen shots of a simulation of the actuators used for mechanical deicing of an aerodynamic surface that was captured by high speed detection equipment are shown on FIGS. 18-21. In the simulation, the temperature of the simulation was −10 degrees Celsius and the ice thickness on the aerodynamic surface was less than 3 millimeters.

Figure 22:
FIG. 22 illustrates features of some embodiments of the present invention.
Figure 23:
FIG. 23 illustrates features of some embodiments of the present invention.

Various screen shots of a simulation of an actuator positioned in an aerodynamic surface was captured by high speed detection equipment are shown on FIGS. 22-23. FIG. 22 shows an actuator with a cylinder in its original position. FIG. 23 shows an actuator with a cylinder in its extended position.

In some embodiments, the system includes an axial vibrating apparatus that includes a vibration mechanism. In the embodiments, the vibration mechanism is installed as a single mechanism or in pairs facing opposite directions. In the embodiments, the vibration mechanism is controlled to vibrate in different frequencies as required by skin and ice accumulated thereon.

In embodiments, the vibrating apparatus is installed in discrete locations inside the lift or steering device and along its leading edge so that a sequential operation is acting along the wing/tail at a determined interval for a determined period of time.

In the embodiments, the single vibrating apparatus is installed on a rail and travelling along the wing/tail while operating continuously or in determined locations and for a determined time.

In embodiments, the vibrating apparatus is installed on a rail and travelling along a limited distance of the wing/tail and several such assemblies are covering the entire area to be deiced. In embodiments, the vibrating apparatus is installed and positioned in the wing/tail to provide coverage of the entire area potentially requiring deicing.

In some embodiments, the vibrating apparatus is defined as a standalone mechanism. In other embodiments, the vibrating apparatus is defined as a subsystem in a protected system. In some embodiments, the vibrating apparatus is configured to transfer electric motor rotational energy into axial movement by using one or more saw tooth coupled devices, spheres, a piston and crank mechanism.

In some embodiments, the vibrating mechanism is configured to vibrate the leading edge of the skin in a frequency between 1 to 1K Hertz for a period of time between 0.1 to 60 seconds and every 30 to 1000 seconds.

In some embodiments, the mechanism remove ice below a certain level based, at least in part, on maintenance of the aerodynamics requirements of the protected system.

In some embodiments, the mechanism causes a determined deflection of the relevant surface of the skin combined with a vibration effect that may result in a sheer force combined with vibration between the ice and the wing surface.

In some embodiments, the operational time is not limited, the mechanism is light weight, and the energy consumption of the vibration mechanism is low compared with the overall energy requirements of the protected systems.

In embodiments, the vibration mechanism is positioned against the leading edge of the skin. In embodiments, the vibration mechanism is configured for easy manual assembly and disassembly. In some embodiments, the vibration mechanism is configured to be used in various types of weather conditions. In embodiments, the vibration mechanism is configured to be installed such that the surfaces of the protected system can be preserved.

In some embodiments, the vibration mechanism eliminates the maintenance issues associated with non-smooth surfaces and their negative effect on the aerodynamics of surfaces. In some embodiments, smooth surfaces are the primary element in efficient and low drag aerodynamics and undisturbed flow is preferred in aircrafts aerodynamics enabling low drag and long endurance.

In some embodiments, the present invention includes an apparatus for removing ice from wings while flying in icing conditions. In the embodiments, the apparatus is positioned inside the wing leading edge.

In some embodiments, one edge of the apparatus is resting against or placed in a predefined gap against the inner side of the leading edge. In the embodiments, the other side of the apparatus is resting against another inner surface of the leading edge or supported against a support mounted inside the leading edge.

In some embodiments, the apparatus is constructed of a motor which converts energy to mechanical rotation of a shaft. In the embodiments, the motor shaft is coupled with a rotating disc. In the embodiments, the coupling between the shaft and the rotating disc may further use a transmission and/or a clutching mechanism. In the embodiments, the rotating disc plane is in the shape or equipped with lumps, saw tooth and/or spheres which are positioned against a non rotating disc. In the embodiments, the non rotating disc plane is also in the shape or equipped with lumps, saw tooth or spheres that are mated against the plane of the rotating disc.

In some embodiments, rotation of the rotating disc with respect to the non rotating or contra rotating disc results in a reciprocating motion of the non rotating or contra rotating disc which deflects the leading edge surface causing removal of the ice accumulated on the leading edge of the protected system by detaching and repelling the ice layer.

In the embodiments, the other plane of the non rotating or contra rotating disc can be coated or coupled with a cushioning material or structural member. In the embodiments, the other plane of the non rotating or contra rotating disc is placed against the inner side of the leading edge, contacting it or positioned in a predetermined gap. In the embodiments, the location where the apparatus interfaces the leading edge surface is predetermined as the location causing optimal ice removal effect when subjected to force which is created due to the reciprocating motion of the apparatus members.

In some embodiments, for example, where the opposite apparatus plane is positioned against the opposite surface of the leading edge it will be placed in a location where the combined effect is causing optimal ice removal. In the embodiments, the mechanism will be positioned in the skin of the protected system based, at least in part, on the projected location of the ice accumulation on the skin surface.

In some embodiments, the opening in the apparatus housing is integrated with the non rotational or contra rotating disc in a manner so that the non rotational or contra rotating disc rotational movement is limited thus allowing only axial movement.

In some embodiments, the vibrational mechanism may operate in different and/or multiple frequencies. In some embodiments, the vibrational mechanism is controlled so as to prevent overloading the skin.

In some embodiments, the apparatus is installed for assembly and disassembly from the wing side while not influencing wing aerodynamics.

In some embodiments, the apparatus can be installed statically while an array of the vibrating mechanisms can be positioned along the protected system having a defined distance between them. In some embodiments, the apparatus is traveling on a rail along the wing leading edge.

In some embodiments, the present invention includes an aerodynamic skin formed of a composite configured for heating thus preventing and/or reducing ice accumulation on surfaces. In some embodiments, the surfaces may include, but are not limited to, surfaces of manned or unmanned airborne vehicles (UAV), wind turbines and/or other surfaces potentially subjected to icing conditions. In some embodiments, the surfaces may include surfaces of wings and/or propellers of manned or unmanned airborne vehicles, wind turbines, and the like. In the embodiments, the wings and/or propellers are formed of an aerodynamic "skin" having an outer surface exposed to one or more environmental conditions.

In some embodiments, the manner or unmanned airborne vehicles, wind turbines and the like are referred to as "protected systems".

In some embodiments, the skin formed of a composite (hereinafter "the composite") may be configured to allow for heating and thus reduction in ice accumulation on the surfaces of the protected systems. In embodiments, the composite includes a heating device that is positioned on or forms an integral part of the composite of a protected system.

Figure 24:
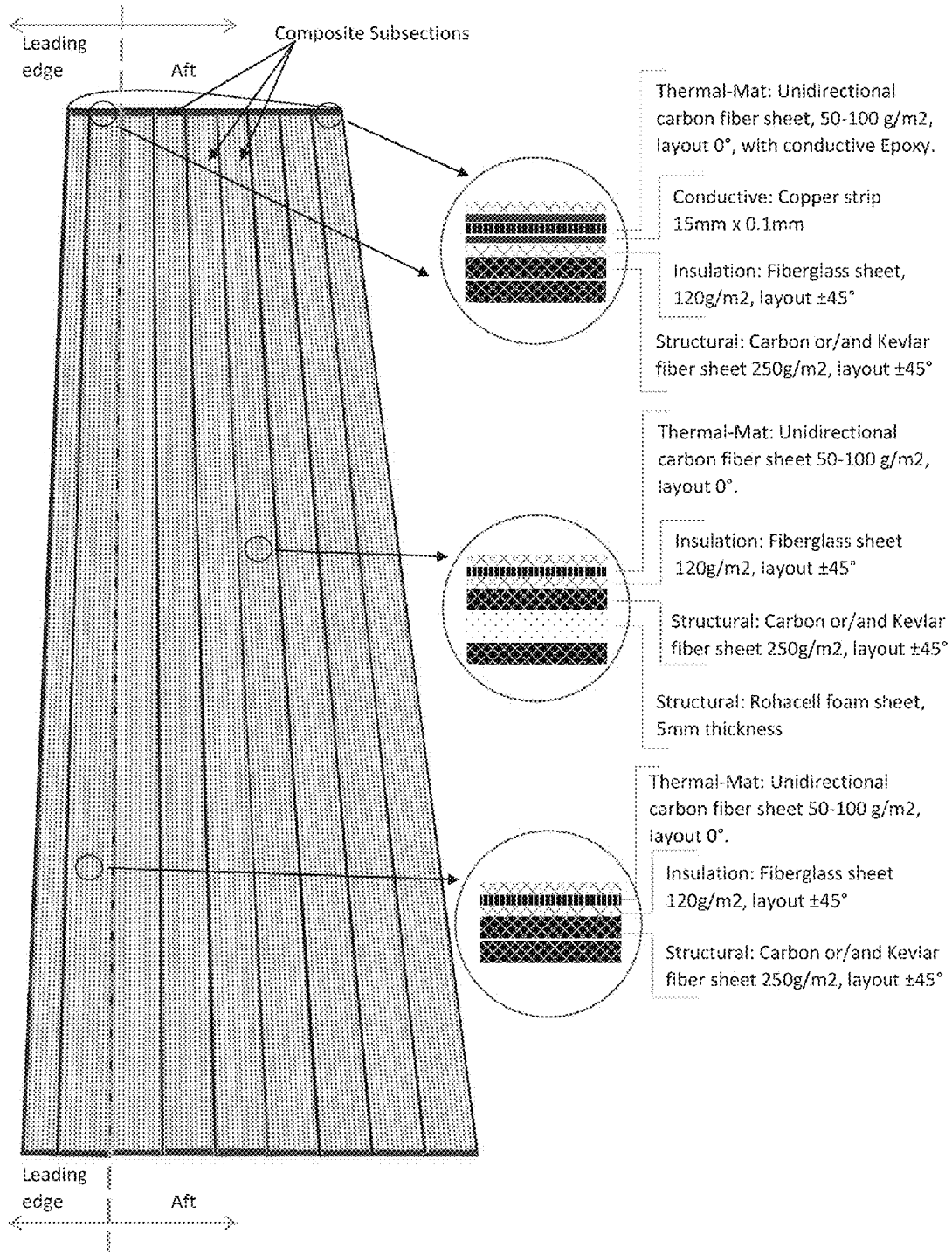
FIG. 24 illustrates features of some embodiments of the present invention.

In some embodiments, the composite may include various subsections as shown in FIG. 24. In embodiments, the different subsections are comprised of various layers as shown in FIGS. 24-25, 2A and 2B.

In some embodiments, one or more subsections of the composite include at least one layer of heat-conductive material having sufficient structural properties for use in a protected system. In the embodiments, the layer is a carbon fiber sheet. In the embodiments, the carbon fiber sheet may have an areal weight ranging from 10 to 250 grams per square meter. In other embodiments, the carbon fiber sheet may have an areal weight ranging from 10 to 100 grams per square meter. In other embodiments, the fiber sheet may have an areal weight ranging from 50 to 200 grams per square meter. In other embodiments, the fiber sheet may have an areal weight ranging from 120 to 180 grams per square meter.

In some embodiments, the carbon fiber sheet may have a layout of 0 degrees. In other embodiments, the carbon fiber sheet may have a layout of 45 degrees. In other embodiments, the carbon fiber sheet may have a layout of 90 degrees.

In some embodiments, the layer of carbon fiber sheet may be at least partially coated with a conductive material such as a conductive epoxy.

In some embodiments, one or more subsections of the composite include electrical and thermal conductive layers. In other embodiments, the electrical and thermal conductive layers may include one or more conductive strips. In yet other embodiments, the conductive strips may be formed of copper, nickel, silver, and/or aluminum. In embodiments, the strips may be 15 millimeters×0.1 millimeter. In other embodiments, the strips may be 10 millimeters×0.5 millimeter. In yet other embodiments, the strips may be 5 millimeters×1.0 millimeter.

In some embodiments, one or more subsections of the composite may include an electrical and thermal insulation layer. In an embodiment, the insulation layer is comprised of a material such as fiberglass or Kevlar sheet. In the embodiments, the fiberglass or Kevlar sheet may have an areal weight ranging from 50 to 250 grams per square meter. In another embodiment, the fiberglass or Kevlar sheet may have an areal weight ranging from 75 to 150 grams per square meter. In yet another embodiment, the fiberglass or Kevlar sheet may have an areal weight ranging from 100 to 130 grams per square meter. In an embodiment, the fiberglass or Kevlar sheet may have an areal weight of 120 grams per square meter.

In some embodiments, the fiberglass or Kevlar sheet may have a layout of 0 degrees. In other embodiments, the fiberglass or Kevlar sheet may have a layout of 45 degrees. In yet other embodiments, the fiberglass or Kevlar sheet may have a layout of 90 degrees.

In some embodiments, one or more subsection of the composite may include one or more structural sheets. In the embodiments, the one or more structural sheets may be formed of foam. In other embodiments, the foam may include Rohacell foam sheet. In some embodiments, the foam sheet thickness may range from 1 millimeter to 10 millimeters. In other embodiments, the foam sheet thickness may range from 3 millimeters to 8 millimeters. In yet other embodiments, the foam sheet thickness may range from 5 millimeters to 7 millimeters. In yet other embodiments, the foam sheet thickness is 5 millimeters.

In some embodiments, at least one subsection includes a top and bottom carbon fiber sheet layer. In some embodiments, at least one subsection is comprised of an electrical and thermal conductive layer and an electrical and thermal insulation layer positioned between the carbon fiber sheet layers.

In some embodiments, at least one subsection includes a carbon fiber sheet top layer and a foam sheet bottom layer. In some embodiments, at least one subsection is comprised of an electrical and thermal insulation layer and another carbon fiber sheet layer positioned between the carbon fiber sheet and foam sheet layers.

In some embodiments, at least one subsection includes a carbon fiber sheet top layer and carbon fiber sheet bottom layer with an electrical and thermal insulation layer in the middle.

In some embodiments, the composite with the heating elements is configured as shown on FIG. 24. In some embodiments, the composite is configured as shown on FIG. 25. In other embodiments, the composite is configured as shown on FIG. 2A. In yet other embodiments, the composite is configured as shown on FIG. 2B.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

Figure 25:
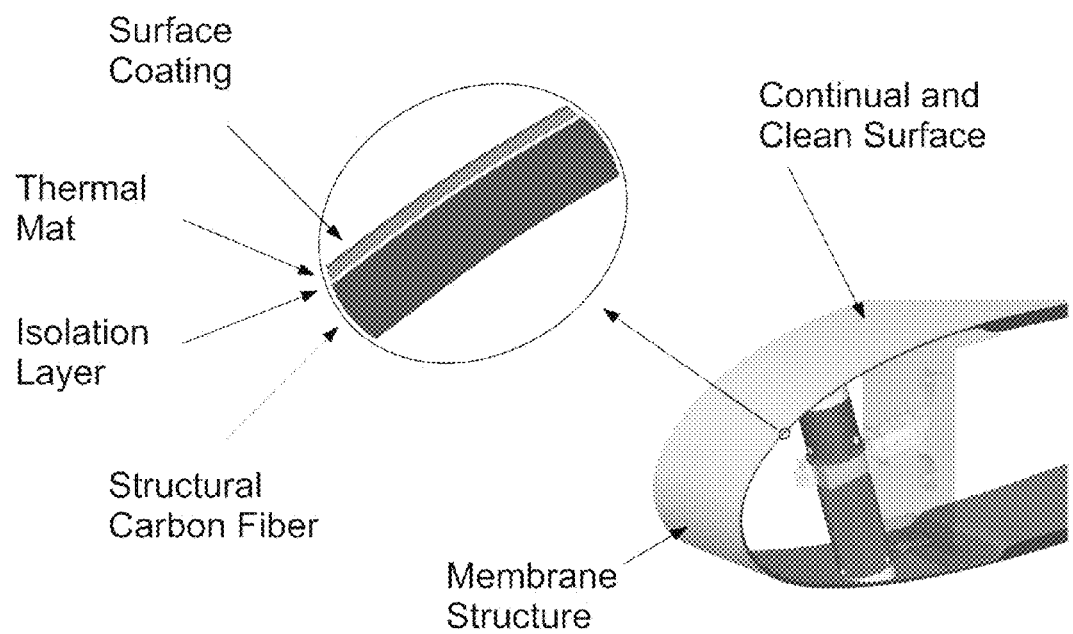
FIG. 25 illustrates features of some embodiments of the present invention.

In some embodiments, the composite forming the "leading edge" (see FIG. 2A) with the heating elements is configured to withstand aerodynamic forces and serve as a membrane configured for efficient transfer kinetic and thermal energy to reduce or prevent ice accumulation on the composite as shown in the non-limiting examples of FIGS. 25, 2A, and 2B.

In an embodiment, the leading edge composite is composed of heating and/or structural elements configured to heat and/or vibrate the composite from 0.1-1000 Hz with a displacement amplitude ranging from 1-10 millimeters as shown in the non-limiting example of FIG. 25.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A method comprising:
    receiving first data from at least one first sensor;
        wherein the at least one first sensor is configured to supply data related to:
            (i) a thickness of an ice layer on a skin surface;
    calculating the thickness of the ice layer;
    comparing the thickness of the ice layer to a threshold thickness;
    based, at least in part, on the comparing the thickness of the ice layer to the threshold thickness, vibrating the skin surface using at least one mechanical element for a sufficient duration, sufficient frequency, and sufficient displacement so as to result in removal of a first portion of the ice layer thereby resulting in at least a partially deiced skin surface; and heating the partially deiced skin surface using at least one heating element;
  wherein the heating is conducted from a leading edge of the skin surface to a trailing edge of the skin surface;
  wherein the heating the partially deiced skin surface results in a sufficient temperature increase in the partially deiced skin surface for removal of a second portion of the ice layer.

2. The method of claim 1, further comprising receiving second data from at least one second sensor,
  wherein the at least one second sensor is configured to supply data related to at least one of the following:
    i) air flow at one or more locations on the skin surface,
    ii) air temperature,
    iii) relative pressure, and
    iv) humidity.

3. The method of claim 1, wherein the threshold thickness is at least 0.3 millimeters.

4. The method of claim 1, wherein the sufficient duration of each of the at least one mechanical elements ranges from 0.01 seconds to 5 seconds.

5. The method of claim 4, wherein the sufficient duration of each of the at least one mechanical elements ranges from 0.01 seconds to 3 seconds.

6. The method of claim 1, wherein the sufficient frequency of ranges from 0.01 to 1000 hertz.

7. The method of claim 6, wherein the sufficient frequency ranges from 10 to 500 hertz.

8. The method of claim 1, wherein the sufficient displacement of each of the at least one mechanical elements ranges from 1 millimeter to 20 millimeters.

9. The method of claim 1, wherein the temperature increase of the partially deiced skin surface is at least 2 degrees Celsius.

10. The method of claim 1, wherein removal of the first portion and the second portion of the ice layer results in complete removal of the ice layer.

11. The method of claim 1, wherein a residual ice layer is present after removal of the first portion and the second portion of the ice layer and the residual ice layer comprises a thickness of 0.5 millimeters to 10 millimeters.

12. A system comprising:
  at least one mechanical element;
    wherein the at least one mechanical element is configured to vibrate a skin surface for a duration, a frequency, and a displacement;
  at least one heating device;
    wherein the at least one heating device comprises at least one heating element;
    wherein the at least one heating device is configured to heat the skin surface from a leading edge of the skin surface to a trailing edge of the skin surface; and
    wherein the at least one heating device is configured, when positioned on the skin surface, to allow the skin surface to be vibrated by the at least one mechanical element for the duration, the frequency and the displacement;
  at least one first sensor;
    wherein the at least one first sensor is configured to provide first data related to a thickness of an ice layer on the skin surface;
  a control system;
    wherein the control system is configured to:
      (i) receive the first data;
      (ii) calculate a thickness of an ice layer on the skin surface;
      (iii) compare the thickness of the ice layer to a threshold thickness;
      (iv) based, at least in part, on the comparison of the thickness of the ice layer to the threshold thickness, activate the at least one mechanical element for a sufficient duration, sufficient frequency, and sufficient displacement so as to result in removal of a first portion of the ice layer thereby resulting in at least a partially deiced skin surface; and
      (v) activate the at least one heating element in the heating device so as to result in:
        (a) heating from the leading edge of the skin surface to the trailing edge of the skin surface; and
        (b) heating the partially deiced skin surface sufficiently for removal of a second portion of the ice layer.

13. The system of claim 12, wherein the heating device is a thermal mat.

14. The system of claim 13, wherein the thermal mat comprises at least two of the following:
  a carbon fiber sheet;
  a foam sheet; and
  a conductive strip.

15. The system of claim 12, wherein the control system is further configured to:
  (vi) calculate a first power required for deicing; and
  (vii) compare the first power required for deicing to a second power available to an aircraft.

16. The system of claim 12, wherein the at least one mechanical element comprises an actuator.

17. The system of claim 12, wherein the at least one mechanical element comprises a plurality of actuators;
  wherein the plurality of actuators are positioned on an installation device; and
  wherein the installation device is configured to be positioned within an aerodynamic surface of an aircraft.

18. A system comprising:
  at least one mechanical element;
    wherein the at least one mechanical element comprises at least one actuator that is configured to produce an amplitude displacement of 1 to 20 millimeters at a frequency of 10 to 500 Hertz;
  wherein the at least one mechanical element is removably positioned within an aerodynamic surface of an aircraft;
  a membrane positioned on the aerodynamic surface of an aircraft;
    wherein the membrane comprises:
      a composite structure having a plurality of layers;
        wherein at least one of the plurality of layers is selected from the group consisting of a carbon-based material and an electrically conductive material; and
      wherein the membrane thickness ranges from 1 millimeter to 10 millimeters; and
  at least one heating element;
  wherein the at least one element is configured to heat the aerodynamic surface from a leading edge of the aerodynamic surface to a trailing edge of the aerodynamic surface.

19. The system of claim 18, further comprising at least one sensor, wherein the at least one sensor is configured to provide first data related to a thickness of an ice layer on the aerodynamic surface.

20. The system of claim 19, further comprising at least one secondary sensor;

wherein the at least one secondary sensor is configured to provide second data related to at least one of the following:
(i) air flow at one or more locations on the skin surface,
(ii) air temperature,
(iii) relative pressure, and
(iv) humidity.

21. The system of claim 20, further comprising a control system;
wherein the control system is configured to:
(i) receive the first data and the second data;
(ii) calculate a thickness of an ice layer on the aerodynamic surface;
(iii) compare the thickness of the ice layer to a threshold thickness;
(iv) based, at least in part, on the comparison of the thickness of the ice layer to the threshold thickness and the second data, activate the at least one mechanical element for a sufficient duration, sufficient frequency, and sufficient displacement so as to result in removal of a first portion of the ice layer thereby resulting in at least a partially deiced skin surface.

22. The system of claim 20, further comprising a control system;
wherein the control system is configured to:
(i) receive the first data and the second data;
(ii) calculate a thickness of an ice layer on the aerodynamic surface;
(iii) compare the thickness of the ice layer to a threshold thickness;
(iv) based, at least in part, on the comparison of the thickness of the ice layer to the threshold thickness and the second data, activate the at least one heating element in the membrane so as to result in:
(a) heating from the leading edge of the aerodynamic surface to the trailing edge of the aerodynamic surface; and
(b) heating the aerodynamic surface sufficiently for removal of the ice layer.

* * * * *